United States Patent
Kumar et al.

(10) Patent No.: US 7,208,911 B1
(45) Date of Patent: Apr. 24, 2007

(54) METHOD FOR CONTROLLING A CYCLE-SKIPPING CONTROL SYSTEM INCLUDING COMPUTER READABLE CODE AND CONTROLLER FOR PERFORMING SUCH METHOD

(75) Inventors: Ajith K. Kumar, Erie, PA (US); Bret D. Worden, Union City, PA (US); Emil Nikolaev Nikolov, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/426,608

(22) Filed: Jun. 27, 2006

Related U.S. Application Data

(60) Provisional application No. 60/803,544, filed on May 31, 2006.

(51) Int. Cl.
*H02P 23/00* (2006.01)

(52) U.S. Cl. ............... 318/809; 318/254; 318/138; 318/727; 318/432; 318/461

(58) Field of Classification Search ........... 318/254, 318/138, 439, 727, 809, 461, 432, 434
See application file for complete search history.

(56) References Cited

U.S. PATENT DOCUMENTS

| | | | |
|---|---|---|---|
| 4,461,985 A | 7/1984 | Stitt | |
| 4,524,316 A | 6/1985 | Brown et al. | |
| 4,791,341 A | 12/1988 | Brown et al. | |
| 5,537,014 A * | 7/1996 | Kettle et al. | 318/375 |
| 5,789,885 A * | 8/1998 | Seel | 318/375 |
| 5,920,162 A * | 7/1999 | Hanson et al. | 318/254 |
| 6,236,177 B1 * | 5/2001 | Zick et al. | 318/362 |

\* cited by examiner

*Primary Examiner*—Rina Duda
(74) *Attorney, Agent, or Firm*—Carlos Hanze; Enrique J. Mora

(57) ABSTRACT

A method, computer-readable code, and controller are provided for controlling a cycle-skipping control system having at least one cycle skipper connected to a multi-phase AC (alternating current) power source to drive a variable frequency load. A respective firing sequence is generated to be applied to a plurality of power switches in the cycle skipper for implementing a desired mode of operation. The stream of pulses may be arranged to form a grouping of two or more closely adjacent pulses over a time interval, wherein each pulse grouping contributes a desired spectral power over the time interval, and further wherein each pulse grouping enables to spread the power over the time interval as compared to a single pulse having the desired spectral power, thereby reducing harmonic components in currents supplied by the power source.

24 Claims, 26 Drawing Sheets

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | XXXXXXX | Vbc | BBF&CCR | Vbc==>Vbc | XXXXXXX | Vbc |
| 2 | AAF&BBR | Vab==>Vab | XXXXXXX | Vab | XXXXXXX | Vab | XXXXXXX | Vab |
| 3 | AAF&BBR | Vab==>Vab | XXXXXXX | Vab | XXXXXXX | Vab | XXXXXXX | Vab |
| 4 | XXXXXXX | Vca | XXXXXXX | Vca | XXXXXXX | Vca | CCF&AAR | Vca==>Vca |
| 5 | XXXXXXX | Vca | XXXXXXX | Vca | XXXXXXX | Vca | CCF&AAR | Vca==>Vca |
| 6 | XXXXXXX | Vbc | BBF&CCR | Vbc==>Vbc | XXXXXXX | Vbc | XXXXXXX | Vbc |
| 7 | XXXXXXX | Vbc | BBF&CCR | Vbc==>Vbc | XXXXXXX | Vbc | XXXXXXX | Vbc |
| 8 | XXXXXXX | Vab | XXXXXXX | Vab | AAF&BBR | Vab==>Vab | XXXXXXX | Vab |
| 9 | XXXXXXX | Vab | XXXXXXX | Vab | AAF&BBR | Vab==>Vab | XXXXXXX | Vab |
| 10 | CCF&AAR | Vca==>Vca | XXXXXXX | Vca | XXXXXXX | Vca | XXXXXXX | Vca |
| 11 | CCF&AAR | Vca==>Vca | XXXXXXX | Vca | XXXXXXX | Vca | XXXXXXX | Vca |
| 12 | XXXXXXX | Vbc | XXXXXXX | Vbc | XXXXXXX | Vbc | BBF&CCR | Vbc==>Vbc |
| 13 | XXXXXXX | Vbc | XXXXXXX | Vbc | XXXXXXX | Vbc | BBF&CCR | Vbc==>Vbc |
| 14 | XXXXXXX | Vab | AAF&BBR | Vab==>Vab | XXXXXXX | Vab | XXXXXXX | Vab |
| 15 | XXXXXXX | Vab | AAF&BBR | Vab==>Vab | XXXXXXX | Vab | XXXXXXX | Vab |
| 16 | XXXXXXX | Vca | XXXXXXX | Vca | CCF&AAR | Vca==>Vca | XXXXXXX | Vca |
| 17 | XXXXXXX | Vca | XXXXXXX | Vca | CCF&AAR | Vca==>Vca | XXXXXXX | Vca |
| 18 | BBF&CCR | Vbc==>Vbc | XXXXXXX | Vbc | XXXXXXX | Vbc | XXXXXXX | Vbc |
| 19 | BBF&CCR | Vbc==>Vbc | XXXXXXX | Vbc | XXXXXXX | Vbc | XXXXXXX | Vbc |
| 20 | XXXXXXX | Vab | XXXXXXX | Vab | XXXXXXX | Vab | AAF&BBR | Vab==>Vab |
| 21 | XXXXXXX | Vab | XXXXXXX | Vab | XXXXXXX | Vab | AAF&BBR | Vab==>Vab |
| 22 | XXXXXXX | Vca | XXXXXXX | Vca | XXXXXXX | Vca | XXXXXXX | Vca |
| 23 | XXXXXXX | Vca | XXXXXXX | Vca | XXXXXXX | Vca | XXXXXXX | Vca |
| 24 | XXXXXXX | Vbc | XXXXXXX | Vbc | BBF&CCR | Vbc==>Vbc | XXXXXXX | Vbc |

*FIG. 4*

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | BBF&CCR | Vbc==>Vbc | XXXXXXX | Vbc | XXXXXXX | Vbc |
| 2 | XXXXXXX | Vab | XXXXXXX | Vab | ACF&BAR | Vab==>Vca | XXXXXXX | Vab |
| 3 | XXXXXXX | Vab | XXXXXXX | Vab | ACF&BAR | Vab==>Vca | XXXXXXX | Vab |
| 4 | CAF&ABR | Vca==>Vab | XXXXXXX | Vca | XXXXXXX | Vca | XXXXXXX | Vca |
| 5 | CAF&ABR | Vca==>Vab | XXXXXXX | Vca | XXXXXXX | Vca | XXXXXXX | Vca |
| 6 | XXXXXXX | Vbc | XXXXXXX | Vbc | XXXXXXX | Vbc | BBF&CCR | Vbc==>Vbc |
| 7 | XXXXXXX | Vbc | XXXXXXX | Vbc | XXXXXXX | Vbc | BBF&CCR | Vbc==>Vbc |
| 8 | XXXXXXX | Vab | ACF&BAR | Vab==>Vca | XXXXXXX | Vab | XXXXXXX | Vab |
| 9 | XXXXXXX | Vab | ACF&BAR | Vab==>Vca | XXXXXXX | Vab | XXXXXXX | Vab |
| 10 | XXXXXXX | Vca | XXXXXXX | Vca | CAF&ABR | Vca==>Vab | XXXXXXX | Vca |
| 11 | XXXXXXX | Vca | XXXXXXX | Vca | CAF&ABR | Vca==>Vab | XXXXXXX | Vca |
| 12 | BBF&CCR | Vbc==>Vbc | XXXXXXX | Vbc | XXXXXXX | Vbc | XXXXXXX | Vbc |
| 13 | BBF&CCR | Vbc==>Vbc | XXXXXXX | Vbc | XXXXXXX | Vbc | XXXXXXX | Vbc |
| 14 | XXXXXXX | Vab | XXXXXXX | Vab | XXXXXXX | Vab | ACF&BAR | Vab==>Vca |
| 15 | XXXXXXX | Vab | XXXXXXX | Vab | XXXXXXX | Vab | ACF&BAR | Vab==>Vca |
| 16 | XXXXXXX | Vca | CAF&ABR | Vca==>Vab | XXXXXXX | Vca | XXXXXXX | Vca |
| 17 | XXXXXXX | Vca | CAF&ABR | Vca==>Vab | XXXXXXX | Vca | XXXXXXX | Vca |
| 18 | XXXXXXX | Vbc | XXXXXXX | Vbc | BBF&CCR | Vbc==>Vbc | XXXXXXX | Vbc |
| 19 | XXXXXXX | Vbc | XXXXXXX | Vbc | BBF&CCR | Vbc==>Vbc | XXXXXXX | Vbc |
| 20 | ACF&BAR | Vab==>Vca | XXXXXXX | Vab | XXXXXXX | Vab | XXXXXXX | Vab |
| 21 | ACF&BAR | Vab==>Vca | XXXXXXX | Vab | XXXXXXX | Vab | XXXXXXX | Vab |
| 22 | XXXXXXX | Vca | XXXXXXX | Vca | XXXXXXX | Vca | CAF&ABR | Vca==>Vab |
| 23 | XXXXXXX | Vca | XXXXXXX | Vca | XXXXXXX | Vca | CAF&ABR | Vca==>Vab |
| 24 | XXXXXXX | Vbc | BBF&CCR | Vbc==>Vbc | XXXXXXX | Vbc | XXXXXXX | Vbc |

FIG. 5

| Firing Window | CS1 | Source/Load | CS2 | Source/Load | CS3 | Source/Load | CS4 | Source/Load |
|---|---|---|---|---|---|---|---|---|
| 1 | AAF&CBR | -Vca==>Vab | XXXXXXX | -Vca | XXXXXXX | -Vca | XXXXXXX | -Vca |
| 2 | AAF&CBR | -Vca==>Vab | XXXXXXX | -Vca | XXXXXXX | -Vca | XXXXXXX | -Vca |
| 3 | XXXXXXX | -Vbc | XXXXXXX | -Vbc | XXXXXXX | -Vbc | CBF&BCR | -Vbc==>Vbc |
| 4 | XXXXXXX | -Vbc | XXXXXXX | -Vbc | XXXXXXX | -Vbc | CBF&BCR | -Vbc==>Vbc |
| 5 | XXXXXXX | -Vab | BCF&AAR | -Vab==>Vca | XXXXXXX | -Vab | XXXXXXX | -Vab |
| 6 | XXXXXXX | -Vab | BCF&AAR | -Vab==>Vca | XXXXXXX | -Vab | XXXXXXX | -Vab |
| 7 | XXXXXXX | -Vca | XXXXXXX | -Vca | AAF&CBR | -Vca==>Vab | XXXXXXX | -Vca |
| 8 | XXXXXXX | -Vca | XXXXXXX | -Vca | AAF&CBR | -Vca==>Vab | XXXXXXX | -Vca |
| 9 | CBF&BCR | -Vbc==>Vbc | XXXXXXX | -Vbc | XXXXXXX | -Vbc | XXXXXXX | -Vbc |
| 10 | CBF&BCR | -Vbc==>Vbc | XXXXXXX | -Vbc | XXXXXXX | -Vbc | XXXXXXX | -Vbc |
| 11 | XXXXXXX | -Vab | XXXXXXX | -Vab | XXXXXXX | -Vab | BCF&AAR | -Vab==>Vca |
| 12 | XXXXXXX | -Vab | XXXXXXX | -Vab | XXXXXXX | -Vab | BCF&AAR | -Vab==>Vca |
| 13 | XXXXXXX | -Vca | AAF&CBR | -Vca==>Vab | XXXXXXX | -Vca | XXXXXXX | -Vca |
| 14 | XXXXXXX | -Vca | AAF&CBR | -Vca==>Vab | XXXXXXX | -Vca | XXXXXXX | -Vca |
| 15 | XXXXXXX | -Vbc | XXXXXXX | -Vbc | CBF&BCR | -Vbc==>Vbc | XXXXXXX | -Vbc |
| 16 | XXXXXXX | -Vbc | XXXXXXX | -Vbc | CBF&BCR | -Vbc==>Vbc | XXXXXXX | -Vbc |
| 17 | BCF&AAR | -Vab==>Vca | XXXXXXX | -Vab | XXXXXXX | -Vab | XXXXXXX | -Vab |
| 18 | BCF&AAR | -Vab==>Vca | XXXXXXX | -Vab | XXXXXXX | -Vab | XXXXXXX | -Vab |
| 19 | XXXXXXX | -Vca | XXXXXXX | -Vca | XXXXXXX | -Vca | AAF&CBR | -Vca==>Vab |
| 20 | XXXXXXX | -Vca | XXXXXXX | -Vca | XXXXXXX | -Vca | AAF&CBR | -Vca==>Vab |
| 21 | XXXXXXX | -Vbc | CBF&BCR | -Vbc==>Vbc | XXXXXXX | -Vbc | XXXXXXX | -Vbc |
| 22 | XXXXXXX | -Vbc | CBF&BCR | -Vbc==>Vbc | XXXXXXX | -Vbc | XXXXXXX | -Vbc |
| 23 | XXXXXXX | -Vab | XXXXXXX | -Vab | BCF&AAR | -Vab==>Vca | XXXXXXX | -Vab |
| 24 | XXXXXXX | -Vab | XXXXXXX | -Vab | BCF&AAR | -Vab==>Vca | XXXXXXX | -Vab |

*FIG. 6*

| Firing Window | CS1 | Source/Load | CS2 | Source/Load |
|---|---|---|---|---|
| 1 | BBF&CCR | Vbc==>Vbc | XXXXXXX | Vbc |
| 2 | XXXXXXX | Vab | ACF&BAR | Vab==>Vca |
| 3 | XXXXXXX | Vab | ACF&BAR | Vab==>Vca |
| 4 | AAF&BBR | Vca==>Vab | XXXXXXX | Vca |
| 5 | AAF&BBR | Vca==>Vab | XXXXXXX | Vca |
| 6 | XXXXXXX | Vbc | BBF&CCR | Vbc==>Vbc |
| 7 | XXXXXXX | Vbc | BBF&CCR | Vbc==>Vbc |
| 8 | ACF&BAR | Vab==>Vca | XXXXXXX | Vab |
| 9 | ACF&BAR | Vab==>Vca | XXXXXXX | Vab |
| 10 | XXXXXXX | Vca | AAF&BBR | Vca==>Vab |
| 11 | XXXXXXX | Vca | AAF&BBR | Vca==>Vab |
| 12 | BBF&CCR | Vbc==>Vbc | XXXXXXX | Vbc |
| 13 | BBF&CCR | Vbc==>Vbc | XXXXXXX | Vbc |
| 14 | XXXXXXX | Vab | ACF&BAR | Vab==>Vca |
| 15 | XXXXXXX | Vab | ACF&BAR | Vab==>Vca |
| 16 | AAF&BBR | Vca==>Vab | XXXXXXX | Vca |
| 17 | AAF&BBR | Vca==>Vab | XXXXXXX | Vca |
| 18 | XXXXXXX | Vbc | BBF&CCR | Vbc==>Vbc |
| 19 | XXXXXXX | Vbc | BBF&CCR | Vbc==>Vbc |
| 20 | ACF&BAR | Vab==>Vca | XXXXXXX | Vab |
| 21 | ACF&BAR | Vab==>Vca | XXXXXXX | Vab |
| 22 | XXXXXXX | Vca | AAF&BBR | Vca==>Vab |
| 23 | XXXXXXX | Vca | AAF&BBR | Vca==>Vab |
| 24 | BBF&CCR | Vbc==>Vbc | XXXXXXX | Vbc |

*FIG. 7*

| Firing Window | CS1 | Source/Load | CS2 | Source/Load |
|---|---|---|---|---|
| 1 | XXXXXXX | Vbc | BBF&CCR | Vbc==>Vbc |
| 2 | AAF&BBR | Vab==>Vab | XXXXXXX | Vab |
| 3 | AAF&BBR | Vab==>Vab | XXXXXXX | Vab |
| 4 | XXXXXXX | Vca | CCF&AAR | Vca==>Vca |
| 5 | XXXXXXX | Vca | CCF&AAR | Vca==>Vca |
| 6 | BBF&CCR | Vbc==>Vbc | XXXXXXX | Vbc |
| 7 | BBF&CCR | Vbc==>Vbc | XXXXXXX | Vbc |
| 8 | XXXXXXX | Vab | AAF&BBR | Vab==>Vab |
| 9 | XXXXXXX | Vab | AAF&BBR | Vab==>Vab |
| 10 | CCF&AAR | Vca==>Vca | XXXXXXX | Vca |
| 11 | CCF&AAR | Vca==>Vca | XXXXXXX | Vca |
| 12 | XXXXXXX | Vbc | BBF&CCR | Vbc==>Vbc |
| 13 | XXXXXXX | Vbc | BBF&CCR | Vbc==>Vbc |
| 14 | AAF&BBR | Vab==>Vab | XXXXXXX | Vab |
| 15 | AAF&BBR | Vab==>Vab | XXXXXXX | Vab |
| 16 | XXXXXXX | Vca | CCF&AAR | Vca==>Vca |
| 17 | XXXXXXX | Vca | CCF&AAR | Vca==>Vca |
| 18 | BBF&CCR | Vbc==>Vbc | | Vbc |
| 19 | BBF&CCR | Vbc==>Vbc | | Vbc |
| 20 | XXXXXXX | Vab | AAF&BBR | Vab==>Vab |
| 21 | XXXXXXX | Vab | AAF&BBR | Vab==>Vab |
| 22 | CCF&AAR | Vca==>Vca | XXXXXXX | Vca |
| 23 | CCF&AAR | Vca==>Vca | XXXXXXX | Vca |
| 24 | XXXXXXX | Vbc | BBF&CCR | Vbc==>Vbc |

*FIG. 8*

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | BCF&CAR | Vbc==>Vca | XXXXXXX | Vbc | XXXXXXX | Vbc |
| 2 | XXXXXXX | Vab | XXXXXXX | Vab | ABF&BCR | Vab==>Vbc | XXXXXXX | Vab |
| 3 | XXXXXXX | Vab | XXXXXXX | Vab | ABF&BCR | Vab==>Vbc | XXXXXXX | Vab |
| 4 | CAF&ABR | Vca==>Vab | XXXXXXX | Vca | XXXXXXX | Vca | XXXXXXX | Vca |
| 5 | CAF&ABR | Vca==>Vab | XXXXXXX | Vca | XXXXXXX | Vca | XXXXXXX | Vca |
| 6 | XXXXXXX | Vbc | XXXXXXX | Vbc | XXXXXXX | Vbc | BCF&CAR | Vbc==>Vca |
| 7 | XXXXXXX | Vbc | XXXXXXX | Vbc | XXXXXXX | Vbc | BCF&CAR | Vbc==>Vca |
| 8 | XXXXXXX | Vab | ABF&BCR | Vab==>Vbc | XXXXXXX | Vab | XXXXXXX | Vab |
| 9 | XXXXXXX | Vab | ABF&BCR | Vab==>Vbc | XXXXXXX | Vab | XXXXXXX | Vab |
| 10 | XXXXXXX | Vca | XXXXXXX | Vca | CAF&ABR | Vca==>Vab | XXXXXXX | Vca |
| 11 | XXXXXXX | Vca | XXXXXXX | Vca | CAF&ABR | Vca==>Vab | XXXXXXX | Vca |
| 12 | BCF&CAR | Vbc==>Vca | XXXXXXX | Vbc | XXXXXXX | Vbc | XXXXXXX | Vbc |
| 13 | BCF&CAR | Vbc==>Vca | XXXXXXX | Vbc | XXXXXXX | Vbc | XXXXXXX | Vbc |
| 14 | XXXXXXX | Vab | XXXXXXX | Vab | XXXXXXX | Vab | ABF&BCR | Vab==>Vbc |
| 15 | XXXXXXX | Vab | XXXXXXX | Vab | XXXXXXX | Vab | ABF&BCR | Vab==>Vbc |
| 16 | XXXXXXX | Vca | CAF&ABR | Vca==>Vab | XXXXXXX | Vca | XXXXXXX | Vca |
| 17 | XXXXXXX | Vca | CAF&ABR | Vca==>Vab | XXXXXXX | Vca | XXXXXXX | Vca |
| 18 | XXXXXXX | Vbc | XXXXXXX | Vbc | BCF&CAR | Vbc==>Vca | XXXXXXX | Vbc |
| 19 | XXXXXXX | Vbc | XXXXXXX | Vbc | BCF&CAR | Vbc==>Vca | XXXXXXX | Vbc |
| 20 | ABF&BCR | Vab==>Vbc | XXXXXXX | Vab | XXXXXXX | Vab | XXXXXXX | Vab |
| 21 | ABF&BCR | Vab==>Vbc | XXXXXXX | Vab | XXXXXXX | Vab | XXXXXXX | Vab |
| 22 | XXXXXXX | Vca | XXXXXXX | Vca | XXXXXXX | Vca | CAF&ABR | Vca==>Vab |
| 23 | XXXXXXX | Vca | XXXXXXX | Vca | XXXXXXX | Vca | CAF&ABR | Vca==>Vab |
| 24 | XXXXXXX | Vbc | BCF&CAR | Vbc==>Vca | XXXXXXX | Vbc | XXXXXXX | Vbc |

FIG. 10

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | XXXXXXX | Vbc | BCF&CAR | Vbc==>Vca | XXXXXXX | Vbc |
| 2 | AAF&BBR | Vab==>Van | XXXXXXX | Vab | XXXXXXX | Vab | XXXXXXX | Vab |
| 3 | AAF&BBR | Vab==>Van | XXXXXXX | Vab | XXXXXXX | Vab | XXXXXXX | Vab |
| 4 | XXXXXXX | Vca | XXXXXXX | Vca | XXXXXXX | Vca | CBF&ACR | Vca==>Vbc |
| 5 | XXXXXXX | Vca | BCF&CAR | Vbc==>Vca | XXXXXXX | Vca | CBF&ACR | Vca==>Vbc |
| 6 | XXXXXXX | Vbc | BCF&CAR | Vbc==>Vca | AAF&BBR | Vab==>Van | XXXXXXX | Vbc |
| 7 | XXXXXXX | Vbc | XXXXXXX | Vab | AAF&BBR | Vab==>Van | XXXXXXX | Vbc |
| 8 | XXXXXXX | Vab | XXXXXXX | Vab | XXXXXXX | Vab | XXXXXXX | Vab |
| 9 | XXXXXXX | Vab | XXXXXXX | Vca | XXXXXXX | Vca | XXXXXXX | Vca |
| 10 | CBF&ACR | Vca==>Vbc | XXXXXXX | Vca | XXXXXXX | Vca | XXXXXXX | Vca |
| 11 | CBF&ACR | Vca==>Vbc | XXXXXXX | Vbc | XXXXXXX | Vbc | XXXXXXX | Vbc |
| 12 | XXXXXXX | Vbc | XXXXXXX | Vbc | XXXXXXX | Vbc | BCF&CAR | Vbc==>Vca |
| 13 | XXXXXXX | Vab | AAF&BBR | Vab==>Van | XXXXXXX | Vab | BCF&CAR | Vbc==>Vca |
| 14 | XXXXXXX | Vab | AAF&BBR | Vab==>Van | XXXXXXX | Vab | XXXXXXX | Vab |
| 15 | XXXXXXX | Vca | XXXXXXX | Vca | XXXXXXX | Vca | XXXXXXX | Vca |
| 16 | XXXXXXX | Vca | XXXXXXX | Vbc | CBF&ACR | Vca==>Vbc | XXXXXXX | Vca |
| 17 | BCF&CAR | Vbc==>Vca | XXXXXXX | Vbc | CBF&ACR | Vca==>Vbc | XXXXXXX | Vbc |
| 18 | BCF&CAR | Vbc==>Vca | XXXXXXX | Vab | XXXXXXX | Vbc | XXXXXXX | Vbc |
| 19 | XXXXXXX | Vab | XXXXXXX | Vab | XXXXXXX | Vab | XXXXXXX | Vab |
| 20 | XXXXXXX | Vab | XXXXXXX | Vca | XXXXXXX | Vab | AAF&BBR | Vab==>Van |
| 21 | XXXXXXX | Vca | CBF&ACR | Vca==>Vbc | XXXXXXX | Vca | AAF&BBR | Vab==>Van |
| 22 | XXXXXXX | Vca | CBF&ACR | Vca==>Vbc | XXXXXXX | Vca | XXXXXXX | Vca |
| 23 | XXXXXXX | Vca | XXXXXXX | Vbc | XXXXXXX | Vca | XXXXXXX | Vca |
| 24 | XXXXXXX | Vbc | XXXXXXX | Vbc | BCF&CAR | Vbc==>Vca | XXXXXXX | Vbc |

FIG. 11

| Firing Window | CS1 | Source/Load | CS2 | Source/Load | CS3 | Source/Load | CS4 | Source/Load |
|---|---|---|---|---|---|---|---|---|
| 1 | AAF&CBR | -Vca==>Vab | XXXXXXX | -Vca | XXXXXXX | -Vca | XXXXXXX | -Vca |
| 2 | AAF&CBR | -Vca==>Vab | XXXXXXX | -Vca | XXXXXXX | -Vca | XXXXXXX | -Vca |
| 3 | XXXXXXX | -Vbc | XXXXXXX | -Vbc | XXXXXXX | -Vbc | CCF&BAR | -Vbc==>Vca |
| 4 | XXXXXXX | -Vbc | XXXXXXX | -Vbc | XXXXXXX | -Vbc | CCF&BAR | -Vbc==>Vca |
| 5 | XXXXXXX | -Vab | BBF&ACR | -Vab==>Vbc | XXXXXXX | -Vab | XXXXXXX | -Vab |
| 6 | XXXXXXX | -Vab | BBF&ACR | -Vab==>Vbc | XXXXXXX | -Vab | XXXXXXX | -Vab |
| 7 | XXXXXXX | -Vca | XXXXXXX | -Vca | AAF&CBR | -Vca==>Vab | XXXXXXX | -Vca |
| 8 | XXXXXXX | -Vca | XXXXXXX | -Vca | AAF&CBR | -Vca==>Vab | XXXXXXX | -Vca |
| 9 | CCF&BAR | -Vbc==>Vca | XXXXXXX | -Vbc | XXXXXXX | -Vbc | XXXXXXX | -Vbc |
| 10 | CCF&BAR | -Vbc==>Vca | XXXXXXX | -Vbc | XXXXXXX | -Vbc | XXXXXXX | -Vbc |
| 11 | XXXXXXX | -Vab | XXXXXXX | -Vab | XXXXXXX | -Vab | BBF&ACR | -Vab==>Vbc |
| 12 | XXXXXXX | -Vab | XXXXXXX | -Vab | XXXXXXX | -Vab | BBF&ACR | -Vab==>Vbc |
| 13 | XXXXXXX | -Vca | AAF&CBR | -Vca==>Vab | XXXXXXX | -Vca | XXXXXXX | -Vca |
| 14 | XXXXXXX | -Vca | AAF&CBR | -Vca==>Vab | XXXXXXX | -Vca | XXXXXXX | -Vca |
| 15 | XXXXXXX | -Vbc | XXXXXXX | -Vbc | CCF&BAR | -Vbc==>Vca | XXXXXXX | -Vbc |
| 16 | XXXXXXX | -Vbc | XXXXXXX | -Vbc | CCF&BAR | -Vbc==>Vca | XXXXXXX | -Vbc |
| 17 | BBF&ACR | -Vab==>Vbc | XXXXXXX | -Vab | XXXXXXX | -Vab | XXXXXXX | -Vab |
| 18 | BBF&ACR | -Vab==>Vbc | XXXXXXX | -Vab | XXXXXXX | -Vab | XXXXXXX | -Vab |
| 19 | XXXXXXX | -Vca | XXXXXXX | -Vca | XXXXXXX | -Vca | AAF&CBR | -Vca==>Vab |
| 20 | XXXXXXX | -Vca | XXXXXXX | -Vca | XXXXXXX | -Vca | AAF&CBR | -Vca==>Vab |
| 21 | XXXXXXX | -Vbc | CCF&BAR | -Vbc==>Vca | XXXXXXX | -Vbc | XXXXXXX | -Vbc |
| 22 | XXXXXXX | -Vbc | CCF&BAR | -Vbc==>Vca | XXXXXXX | -Vbc | XXXXXXX | -Vbc |
| 23 | XXXXXXX | -Vab | XXXXXXX | -Vab | BBF&ACR | -Vab==>Vbc | XXXXXXX | -Vab |
| 24 | XXXXXXX | -Vab | XXXXXXX | -Vab | BBF&ACR | -Vab==>Vbc | XXXXXXX | -Vab |

FIG. 12

| Firing Window | CS1 | Source/Load | CS2 | Source/Load |
|---|---|---|---|---|
| 1 | AAF&CBR | -Vca==>Vab | XXXXXXX | -Vca |
| 2 | AAF&CBR | -Vca==>Vab | XXXXXXX | -Vca |
| 3 | XXXXXXX | -Vbc | CCF&BAR | -Vbc==>Vca |
| 4 | XXXXXXX | -Vbc | CCF&BAR | -Vbc==>Vca |
| 5 | BBF&ACR | -Vab==>Vbc | XXXXXXX | -Vab |
| 6 | BBF&ACR | -Vab==>Vbc | XXXXXXX | -Vab |
| 7 | XXXXXXX | -Vca | AAF&CBR | -Vca==>Vab |
| 8 | XXXXXXX | -Vca | AAF&CBR | -Vca==>Vab |
| 9 | CCF&BAR | -Vbc==>Vca | XXXXXXX | -Vbc |
| 10 | CCF&BAR | -Vbc==>Vca | XXXXXXX | -Vbc |
| 11 | XXXXXXX | -Vab | BBF&ACR | -Vab==>Vbc |
| 12 | XXXXXXX | -Vab | BBF&ACR | -Vab==>Vbc |
| 13 | AAF&CBR | -Vca==>Vab | XXXXXXX | -Vca |
| 14 | AAF&CBR | -Vca==>Vab | XXXXXXX | -Vca |
| 15 | XXXXXXX | -Vbc | CCF&BAR | -Vbc==>Vca |
| 16 | XXXXXXX | -Vbc | CCF&BAR | -Vbc==>Vca |
| 17 | BBF&ACR | -Vab==>Vbc | XXXXXXX | -Vab |
| 18 | BBF&ACR | -Vab==>Vbc | XXXXXXX | -Vab |
| 19 | XXXXXXX | -Vca | AAF&CBR | -Vca==>Vab |
| 20 | XXXXXXX | -Vca | AAF&CBR | -Vca==>Vab |
| 21 | CCF&BAR | -Vbc==>Vca | XXXXXXX | -Vbc |
| 22 | CCF&BAR | -Vbc==>Vca | XXXXXXX | -Vbc |
| 23 | | -Vab | BBF&ACR | -Vab==>Vbc |
| 24 | | -Vab | BBF&ACR | -Vab==>Vbc |

*FIG. 13*

| Firing Window | CS1 | Source/Load | CS2 | Source/Load |
|---|---|---|---|---|
| 1 | XXXXXX | Vbc | BCF&CAR | Vbc==>Vca |
| 2 | AAF&BBR | Vab==>Vab | XXXXXX | Vab |
| 3 | AAF&BBR | Vab==>Vab | XXXXXX | Vab |
| 4 | XXXXXX | Vca | CBF&ACR | Vca==>Vbc |
| 5 | XXXXXX | Vca | CBF&ACR | Vca==>Vbc |
| 6 | BCF&CAR | Vbc==>Vca | XXXXXX | Vbc |
| 7 | BCF&CAR | Vbc==>Vca | XXXXXX | Vbc |
| 8 | XXXXXX | Vab | AAF&BBR | Vab==>Vab |
| 9 | XXXXXX | Vab | AAF&BBR | Vab==>Vab |
| 10 | CBF&ACR | Vca==>Vbc | XXXXXX | Vca |
| 11 | CBF&ACR | Vca==>Vbc | XXXXXX | Vca |
| 12 | XXXXXX | Vbc | BCF&CAR | Vbc==>Vca |
| 13 | XXXXXX | Vbc | BCF&CAR | Vbc==>Vca |
| 14 | AAF&BBR | Vab==>Vab | XXXXXX | Vab |
| 15 | AAF&BBR | Vab==>Vab | XXXXXX | Vab |
| 16 | XXXXXX | Vca | CBF&ACR | Vca==>Vbc |
| 17 | XXXXXX | Vca | CBF&ACR | Vca==>Vbc |
| 18 | BCF&CAR | Vbc==>Vca | XXXXXX | Vbc |
| 19 | BCF&CAR | Vbc==>Vca | XXXXXX | Vbc |
| 20 | XXXXXX | Vab | AAF&BBR | Vab==>Vab |
| 21 | XXXXXX | Vab | AAF&BBR | Vab==>Vab |
| 22 | CBF&ACR | Vca==>Vbc | XXXXXX | Vca |
| 23 | CBF&ACR | Vca==>Vbc | XXXXXX | Vca |
| 24 | XXXXXX | Vbc | BCF&CAR | Vbc==>Vca |

*FIG. 14*

| Firing Window | CS1 | Source/Load | CS2 | Source/Load | CS3 | Source/Load | CS4 | Source/Load |
|---|---|---|---|---|---|---|---|---|
| 1 | XXXXXXX | Vbc | XXXXXXX | Vbc | XXXXXXX | Vbc | BAF&CBR | Vbc==>Vab |
| 2 | XXXXXXX | Vab | ABF&BCR | Vab==>Vbc | XXXXXXX | Vab | XXXXXXX | Vab |
| 3 | XXXXXXX | Vab | ABF&BCR | Vab==>Vbc | XXXXXXX | Vab | XXXXXXX | Vab |
| 4 | XXXXXXX | Vca | XXXXXXX | Vca | CCF&AAR | Vca==>Vca | XXXXXXX | Vca |
| 5 | XXXXXXX | Vca | XXXXXXX | Vca | CCF&AAR | Vca==>Vca | XXXXXXX | Vca |
| 6 | BAF&CBR | Vbc==>Vab | XXXXXXX | Vbc | XXXXXXX | Vbc | XXXXXXX | Vbc |
| 7 | BAF&CBR | Vbc==>Vab | XXXXXXX | Vbc | XXXXXXX | Vbc | XXXXXXX | Vbc |
| 8 | XXXXXXX | Vab | XXXXXXX | Vab | XXXXXXX | Vab | ABF&BCR | Vab==>Vbc |
| 9 | XXXXXXX | Vab | XXXXXXX | Vab | XXXXXXX | Vab | ABF&BCR | Vab==>Vbc |
| 10 | XXXXXXX | Vca | XXXXXXX | Vca | XXXXXXX | Vca | XXXXXXX | Vca |
| 11 | XXXXXXX | Vca | XXXXXXX | Vca | XXXXXXX | Vca | XXXXXXX | Vca |
| 12 | XXXXXXX | Vbc | XXXXXXX | Vbc | BAF&CBR | Vbc==>Vab | XXXXXXX | Vbc |
| 13 | XXXXXXX | Vbc | XXXXXXX | Vbc | BAF&CBR | Vbc==>Vab | XXXXXXX | Vbc |
| 14 | ABF&BCR | Vab==>Vbc | XXXXXXX | Vab | XXXXXXX | Vab | XXXXXXX | Vab |
| 15 | ABF&BCR | Vab==>Vbc | XXXXXXX | Vab | XXXXXXX | Vab | XXXXXXX | Vab |
| 16 | XXXXXXX | Vca | XXXXXXX | Vca | XXXXXXX | Vca | XXXXXXX | Vca |
| 17 | XXXXXXX | Vca | XXXXXXX | Vca | XXXXXXX | Vca | XXXXXXX | Vca |
| 18 | XXXXXXX | Vbc | BAF&CBR | Vbc==>Vab | XXXXXXX | Vbc | XXXXXXX | Vbc |
| 19 | XXXXXXX | Vbc | BAF&CBR | Vbc==>Vab | XXXXXXX | Vbc | XXXXXXX | Vbc |
| 20 | XXXXXXX | Vab | XXXXXXX | Vab | ABF&BCR | Vab==>Vbc | XXXXXXX | Vab |
| 21 | XXXXXXX | Vab | XXXXXXX | Vab | ABF&BCR | Vab==>Vbc | XXXXXXX | Vab |
| 22 | CCF&AAR | Vca==>Vca | XXXXXXX | Vca | XXXXXXX | Vca | CCF&AAR | Vca==>Vca |
| 23 | CCF&AAR | Vca==>Vca | XXXXXXX | Vca | XXXXXXX | Vca | CCF&AAR | Vca==>Vca |
| 24 | XXXXXXX | Vbc | XXXXXXX | Vbc | XXXXXXX | Vbc | BAF&CBR | Vbc==>Vab |

FIG. 16

| Firing Window | CS1 | Source/Load | CS2 | Source/Load |
|---|---|---|---|---|
| 1 | BBF&CCR | Vbc==>Vbc | BCF&CBR | -Vbc==>Vbc |
| 2 | XXXXXXX | | XXXXXXX | |
| 3 | AAF&BCR | -Vab==>Vca | ACF&BAR | Vab==>Vca |
| 4 | XXXXXXX | | XXXXXXX | |
| 5 | CAF&ABR | Vca==>Vab | CBF&AAR | -Vca==>Vab |
| 6 | XXXXXXX | | XXXXXXX | |
| 7 | BCF&CBR | -Vbc==>Vbc | BBF&CCR | Vbc==>Vbc |
| 8 | XXXXXXX | | XXXXXXX | |
| 9 | ACF&BAR | Vab==>Vca | AAF&BCR | -Vab==>Vca |
| 10 | XXXXXXX | | XXXXXXX | |
| 11 | CBF&AAR | -Vca==>Vab | CAF&ABR | Vca==>Vab |
| 12 | XXXXXXX | | XXXXXXX | |
| 13 | BBF&CCR | Vbc==>Vbc | BCF&CBR | -Vbc==>Vbc |
| 14 | XXXXXXX | | XXXXXXX | |
| 15 | AAF&BCR | -Vab==>Vca | ACF&BAR | Vab==>Vca |
| 16 | XXXXXXX | | XXXXXXX | |
| 17 | CAF&ABR | Vca==>Vab | CBF&AAR | -Vca==>Vab |
| 18 | XXXXXXX | | XXXXXXX | |
| 19 | BCF&CBR | -Vbc==>Vbc | BBF&CCR | Vbc==>Vbc |
| 20 | XXXXXXX | | XXXXXXX | |
| 21 | ACF&BAR | Vab==>Vca | AAF&BCR | -Vab==>Vca |
| 22 | XXXXXXX | | XXXXXXX | |
| 23 | CBF&AAR | -Vca==>Vab | CAF&ABR | Vca==>Vab |
| 24 | XXXXXXX | | XXXXXXX | |

*FIG. 17*

| Firing Window | CS1 | Source/Load | CS2 | Source/Load |
|---|---|---|---|---|
| 1 | BAF&CBR | Vbc==>Vab | XXXXXXX | |
| 2 | XXXXXXX | | XXXXXXX | |
| 3 | AAF&BBR | Vab==>Vab | XXXXXXX | |
| 4 | XXXXXXX | | XXXXXXX | |
| 5 | XXXXXXX | | CBF&ACR | Vca==>Vbc |
| 6 | XXXXXXX | | XXXXXXX | |
| 7 | XXXXXXX | | BBF&CCR | Vbc==>Vbc |
| 8 | XXXXXXX | | XXXXXXX | |
| 9 | ACF&BAR | Vab==>Vca | XXXXXXX | |
| 10 | XXXXXXX | | XXXXXXX | |
| 11 | CCF&AAR | Vca==>Vca | XXXXXXX | |
| 12 | XXXXXXX | | XXXXXXX | |
| 13 | XXXXXXX | | BAF&CBR | Vbc==>Vab |
| 14 | XXXXXXX | | XXXXXXX | |
| 15 | XXXXXXX | | AAF&BBR | Vab==>Vab |
| 16 | XXXXXXX | | XXXXXXX | |
| 17 | CBF&ACR | Vca==>Vbc | XXXXXXX | |
| 18 | XXXXXXX | | XXXXXXX | |
| 19 | BBF&CCR | Vbc==>Vbc | XXXXXXX | |
| 20 | XXXXXXX | | XXXXXXX | |
| 21 | XXXXXXX | | ACF&BAR | Vab==>Vca |
| 22 | XXXXXXX | | XXXXXXX | |
| 23 | XXXXXXX | | CCF&AAR | Vca==>Vca |
| 24 | XXXXXXX | | XXXXXXX | |

*FIG. 24*

| Firing Window | CS1 | Source/Load | CS2 | Source/Load |
|---|---|---|---|---|
| 1 | BBF&CCR | Vbc==>Vbc | BAF&CBR | |
| 2 | XXXXXXX | −Vca | XXXXXXX | |
| 3 | ABF&BCR | Vab==>Vbc | XXXXXXX | |
| 4 | XXXXXXX | | XXXXXXX | |
| 5 | CBF&ACR | | CCF&AAR | Vca==>Vca |
| 6 | XXXXXXX | | XXXXXXX | |
| 7 | XXXXXXX | | BCF&CAR | Vbc==>Vca |
| 8 | XXXXXXX | | XXXXXXX | |
| 9 | AAF&BBR | Vab==>Vab | ACF&BAR | |
| 10 | XXXXXXX | | XXXXXXX | |
| 11 | CAF&ABR | Vca==>Vab | XXXXXXX | |
| 12 | XXXXXXX | | XXXXXXX | |
| 13 | BAF&CBR | | BBF&CCR | Vbc==>Vbc |
| 14 | XXXXXXX | | XXXXXXX | −Vca |
| 15 | XXXXXXX | | ABF&BCR | Vab==>Vbc |
| 16 | XXXXXXX | | XXXXXXX | |
| 17 | CCF&AAR | Vca==>Vca | CBF&ACR | |
| 18 | XXXXXXX | | XXXXXXX | |
| 19 | BCF&CAR | Vbc==>Vca | XXXXXXX | |
| 20 | XXXXXXX | | XXXXXXX | |
| 21 | ACF&BAR | | AAF&BBR | Vab==>Vab |
| 22 | XXXXXXX | | XXXXXXX | |
| 23 | XXXXXXX | | CAF&ABR | Vca==>Vab |
| 24 | XXXXXXX | | XXXXXXX | |

FIG. 27

| Firing Window | CS1 | Source/Load | CS2 | Source/Load |
|---|---|---|---|---|
| 1 | XXXXXXX | | BAF&BBF&CCR | Vbc==>1/2Vab & 1/2Vca |
| 2 | AAF&ACF&BBR | Vab==>1/2Vab & 1/2Vbc | XXXXXXX | |
| 3 | AAF&ACF&BBR | Vab==>1/2Vab & 1/2Vbc | XXXXXXX | |
| 4 | XXXXXXX | | CAF&CBR&ACR | Vca==>1/2Vab & 1/2Vbc |
| 5 | XXXXXXX | | CAF&CBR&ACR | Vca==>1/2Vab & 1/2Vbc |
| 6 | BCF&CAR&CBR | Vbc==>1/2Vca & 1/2Vbc | XXXXXXX | |
| 7 | BCF&CAR&CBR | Vbc==>1/2Vca & 1/2Vbc | XXXXXXX | |
| 8 | XXXXXXX | | AAF&ACF&BBR | Vab==>1/2Vab & 1/2Vbc |
| 9 | XXXXXXX | | AAF&ACF&BBR | Vab==>1/2Vab & 1/2Vbc |
| 10 | CBF&CCF&AAR | Vca==>1/2Vab & 1/2Vca | XXXXXXX | |
| 11 | CBF&CCF&AAR | Vca==>1/2Vab & 1/2Vca | XXXXXXX | |
| 12 | XXXXXXX | | BCF&CAR&CBR | Vbc==>1/2Vca & 1/2Vbc |
| 13 | XXXXXXX | | BCF&CAR&CBR | Vbc==>1/2Vca & 1/2Vbc |
| 14 | ABF&BAR&BCR | Vab==>1/2Vab & 1/2Vca | XXXXXXX | |
| 15 | ABF&BAR&BCR | Vab==>1/2Vab & 1/2Vca | XXXXXXX | |
| 16 | XXXXXXX | | CBF&CCF&AAR | Vca==>1/2Vab & 1/2Vca |
| 17 | XXXXXXX | | CBF&CCF&AAR | Vca==>1/2Vab & 1/2Vca |
| 18 | BAF&BBF&CCR | Vbc==>1/2Vab & 1/2Vca | XXXXXXX | |
| 19 | BAF&BBF&CCR | Vbc==>1/2Vab & 1/2Vca | XXXXXXX | |
| 20 | XXXXXXX | | ABF&BAR&BCR | Vab==>1/2Vab & 1/2Vca |
| 21 | XXXXXXX | | ABF&BAR&BCR | Vab==>1/2Vab & 1/2Vca |
| 22 | CAF&CBR&ACR | Vca==>1/2Vab & 1/2Vbc | XXXXXXX | |
| 23 | CAF&CBR&ACR | Vca==>1/2Vab & 1/2Vbc | XXXXXXX | |
| 24 | XXXXXXX | | BAF&BBF&CCR | Vbc==>1/2Vab & 1/2Vca |

FIG. 29

| Firing Window | CS1 | Source/Load | CS2 | Source/Load |
|---|---|---|---|---|
| 1 | BAF&BBF&CCR | Vbc | CAR&CBR&BCF | Vbc |
| 2 | XXXXXXX | −Vca | XXXXXXX | −Vca |
| 3 | AAF&ACF&BBR | Vab | BAR&ABF&ACF | Vab |
| 4 | XXXXXXX | −Vbc | XXXXXXX | −Vbc |
| 5 | CAF&CBR&ACR | Vca | AAR&CBF&ACR | Vca |
| 6 | XXXXXXX | −Vab | XXXXXXX | −Vab |
| 7 | CAR&CBR&BCF | Vbc | BAF&BBF&CCR | Vbc |
| 8 | XXXXXXX | −Vca | XXXXXXX | −Vca |
| 9 | BAR&ABF&ACF | Vab | AAF&ACF&BBR | Vab |
| 10 | XXXXXXX | −Vbc | XXXXXXX | −Vbc |
| 11 | AAR&CBF&ACR | Vca | CAF&CBR&ACR | Vca |
| 12 | XXXXXXX | −Vab | XXXXXXX | −Vab |
| 13 | BAF&BBF&CCR | Vbc | CAR&CBR&BCF | Vbc |
| 14 | XXXXXXX | −Vca | XXXXXXX | −Vca |
| 15 | AAF&BBR&BCR | Vab | BAR&ABF&ACF | Vab |
| 16 | XXXXXXX | −Vbc | XXXXXXX | −Vbc |
| 17 | CAF&ABR&CCF | Vca | AAR&CBF&ACR | Vca |
| 18 | XXXXXXX | −Vab | XXXXXXX | −Vab |
| 19 | CAR&CBR&BCF | Vbc | BAF&BBF&CCR | Vbc |
| 20 | XXXXXXX | −Vca | XXXXXXX | −Vca |
| 21 | BAR&ABF&ACF | Vab | AAF&BBR&BCR | Vab |
| 22 | XXXXXXX | −Vbc | XXXXXXX | −Vbc |
| 23 | AAR&CBF&ACR | Vca | CAF&ABR&CCF | Vca |
| 24 | XXXXXXX | −Vab | XXXXXXX | −Vab |

*FIG. 31*

METHOD FOR CONTROLLING A CYCLE-SKIPPING CONTROL SYSTEM INCLUDING COMPUTER READABLE CODE AND CONTROLLER FOR PERFORMING SUCH METHOD

RELATED APPLICATIONS

This application claims the benefit of provisional application Ser. No. 60/803,544 filed May 31, 2006, which application is incorporated herein by reference in its entirety. This application is further related to co-pending U.S. application Ser. No. 11/421,193 filed May 31, 2006 and co-pending U.S. application Ser. No. 11/421,203 filed May 31, 2006.

FIELD OF THE INVENTION

The present invention is generally related to drive systems for variable frequency alternating current (ac) electromotive machines, and, more particularly, to a motor speed control system based on "cycle-skipping" techniques.

Aspects of the present invention provide improvements to a cycle-skipping motor speed control system, such as disclosed in U.S. Pat. Nos. 4,461,985; 4,524,316 and 4,791,341, each assigned to General Electric Company (the same assignee of the present invention), and each expressly incorporated herein by reference in their entirety.

According to the disclosure of the referenced patents, a variable speed 3-phase ac motor may be connected to a 3-phase source of alternating voltage via a plurality of controllable solid state power switches, such as solid state controlled rectifiers (SCRs) (e.g., thyristors). The respective switches are so arranged and controlled to produce a voltage/current output at a desired frequency and/or magnitude, such that the motor speed can be reduced. This is achieved skipping selected cycles of the input source voltage to produce the desired output. Consequently, the fundamental frequency of the source voltage becomes a multiple (e.g., 2×, 3×, 4×) of the fundamental frequency (f) of the output voltage and the running speed of the motor will be correspondingly reduced compared to full speed.

Systems, such as disclosed in the referenced patents, have operated quite successfully in various practical applications, such as locomotive applications. The cycle skipper current, however, is relatively rich in harmonics, causing undesirable effects, such as vibration, noise and heating effects. When two or more cycle skippers are connected to a common source to drive multiple loads and the firing patterns for such cycle skippers are temporally aligned (e.g., concurrent firings), the source current waveforms of this cycle-skipping system tend to develop harmonic components of relatively higher amplitude, compared to the cycle skipper load current, that can increase the foregoing undesirable effects, such as vibration, noise and heating effects. Accordingly, it would be desirable to provide a system and/or control techniques that allow operation of a cycle-skipping system comprising, one or more cycle skippers connected to a common source to drive single/multiple loads, wherein the firing patterns and/or circuit architecture are arranged to better distribute per/phase current flow over the firing cycle of one or more cycle skippers so as to reduce the magnitude of such harmonic components and thereby reduce any concomitant undesirable effects, both on the source and on the load sides, as well as reduction of voltage harmonics.

BRIEF DESCRIPTION OF THE DRAWINGS

These and other advantages of the invention will be more apparent from the following description in view of the drawings that show:

FIGS. 4–6 indicate exemplary families of firing signals for a number of multiple cycle skippers, as the one cycle skipper shown in FIG. 2, configured to provide ¼ speed operation, for the example case of CBA input phase rotation and CBA output phase rotation.

FIGS. 7–8 indicate exemplary families of firing signals for a number of multiple cycle skippers, as the one cycle skipper shown in FIG. 2, configured to provide ½ speed single pulse operation, for the example case of CBA input phase rotation and CBA output phase rotation.

FIGS. 10–14 indicate exemplary families of firing signals for a number of multiple cycle skippers, as the one cycle skipper shown in FIG. 9, under various operational conditions.

FIGS. 16–17 indicate exemplary families of firing signals for a number of multiple cycle skippers, as the one cycle skipper shown in FIG. 15, under various operational conditions.

FIGS. 22, 23, and 24 are directed to one example embodiment regarding a three-phase cycle skipping system, wherein a firing sequence comprises groupings of double pulses, and further wherein a time gap between any successive first and second pulse groups in a respective electrical phase of the load comprises non-uniformly distributed gaps.

FIGS. 25, 26, and 27 are directed to one example embodiment regarding a three-phase cycle skipping system, wherein a firing sequence comprises groupings of triple pulses, and further wherein the time gap between any successive first and second pulse groups having a combined opposite polarity in a respective electrical phase of the load comprises non-uniformly distributed gaps.

FIGS. 28 and 29 are directed to one example embodiment regarding a three-phase cycle skipping system operating at ¼ speed operation, wherein a firing sequence comprises groupings of triplet pulses, and further wherein the time gap between any successive first and second pulse groups having a combined opposite polarity in a respective electrical phase of the load comprises uniformly distributed gaps.

FIGS. 30 and 31 are directed to one example embodiment regarding a three-phase cycle skipping system operating at ½ speed operation, wherein a firing sequence comprises groupings of triplet pulses, and further wherein the time gap between any successive first and second pulse groups having a combined opposite polarity in a respective electrical phase of the load comprises uniformly distributed gaps.

DETAILED DESCRIPTION OF THE INVENTION

Figure 1:
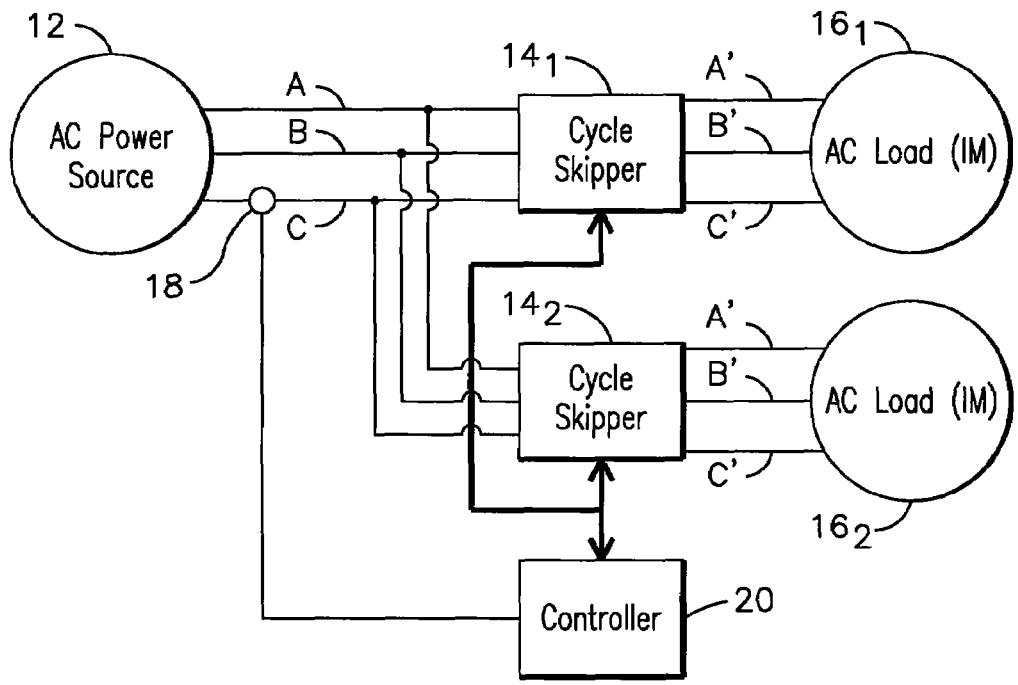
FIG. 1 is a schematic of an exemplary drive system comprising two or more cycle skippers connected to a common power source to drive two or more variable speed induction motors.

The drive system shown in FIG. 1 in one example embodiment comprises a 3-phase power source 12, such as an ac generator (sometimes referred to as an "alternator") which serves as a source of alternating voltage to be applied by way of two or more cycle skippers, such as cycle skippers $14_1$ and $14_2$, to two or more variable frequency 3-phase ac loads $16_1$ and $16_2$, such as induction motors. The fundamental frequency of the voltage at the output of the generator 12 (i.e., the frequency of the fundamental sinusoidal component of the generator's output voltage waveform) is "f" Hertz, and the rms magnitude of this voltage is "v" volts. The magnitude of f depends on the angular velocity (rpm) at which the generator rotor is driven by a prime mover (not shown) mechanically coupled to the rotor of the generator.

In one exemplary application, each motor 16 may be used to drive an impeller or the blades of a blower or fan that may be part of an air cooling system of a self-propelled traction vehicle, such as a diesel-electric locomotive. In this exemplary application, the prime mover may be a variable speed diesel engine. Accordingly, both the frequency and the magnitude of the alternating voltage output of the generator 12 may vary. By way of example, in one exemplary embodiment, f can vary in a 4-to-1 range between 26 and 105 Hz, and v will correspondingly vary, with f, in a range between 100 and 402 volts rms. In one exemplary embodiment the generated voltage has a generally sinusoidal waveform.

The inventors of the present invention have innovatively recognized control techniques and/or circuit architecture that will allow operation of a cycle-skipping system comprising one or more cycle skippers connected to a common source to drive single/multiple loads while reducing the magnitude of such harmonic components and thereby reducing concomitant undesirable effects, such as noise, heating effects and torque pulsations. The description below will now proceed to discuss control techniques designed so that the firing patterns for multiple cycle skippers are temporally shifted (e.g., non-concurrent firings over a firing cycle). This shifting may be conceptualized as a phase angle shift between the firing patterns applied to the multiple cycle-skippers and enables to advantageously reduce the magnitude of harmonic components that may develop at the source currents.

The first, second, and third phases of the 3-phase windings of generator 12 are so arranged to respectively energize three power input terminals A, B, and C of a cycle-skipping speed control system embodying aspects of the present invention. The output terminals of the system are designated A", B" and C", and they in turn are respectively adapted to be connected to the corresponding phases of the armature windings of the motors 16, such as via suitable sensors 18 (e.g., current and/or voltage sensor) that provide feedback signals. For the sake of simplicity of illustration, it is noted that just one sensor is shown in FIG. 1. It will be appreciated, however, that each of the phases may include such sensors.

Figure 2:
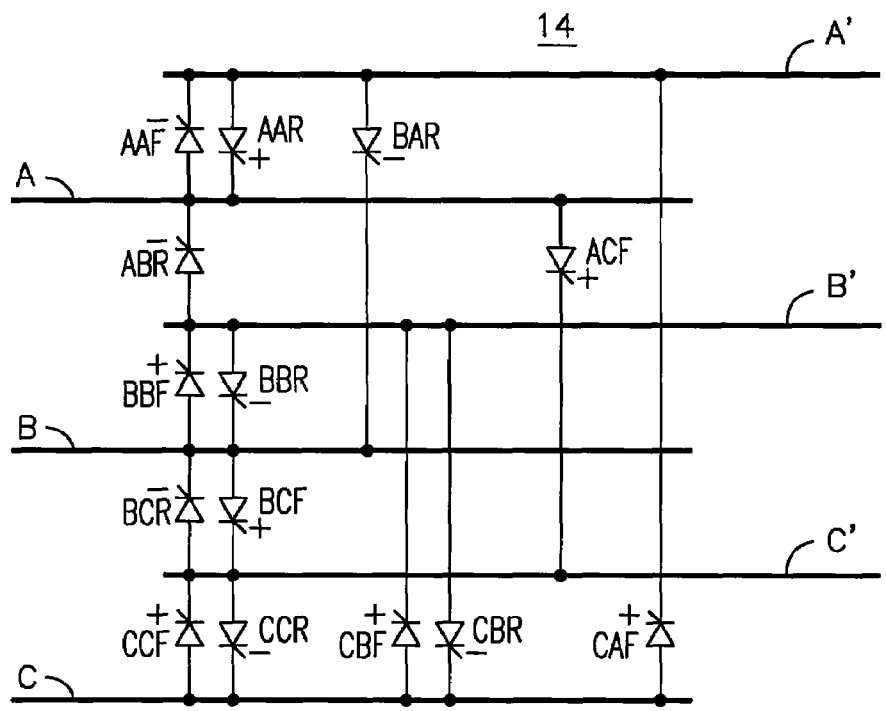
FIG. 2 illustrates one example baseline circuit architecture for one cycle skipper.

As indicated in FIG. 2, the input and output terminals of the speed control system are interconnected by means of a plurality of controllable power switches, such as silicon controlled rectifiers (SCRs). In the illustrated embodiment of the invention, the switches include a first switch pair (AAF and AAR) connected between the first input A and output terminal A", a second switch pair (BBF and BBR) connected between the second input B and output terminal B", a third switch pair (CCF and CCR) connected between the third input C and output terminal C", a fourth switch pair (CBF and CBR) connected between the third input terminal C and the second output terminal B', a fifth switch pair (BCR and BCF) connected between the second input terminal B and the third output terminal C'. As shown in FIG. 2, the foregoing switch pairs are arranged in inverse-parallel relationship.

As further shown in FIG. 2, a switch ABR is connected between the first input terminal A and the second output terminal B', a switch ACF is connected between the same input terminal A and the third output terminal C', switches BAR and CAF are connected between the first output terminal A' and the second and third input terminals B and C, respectively. It will now be apparent that the first three switch pairs connect the three source phases to the corresponding motor phases, whereas the fourth and fifth switch pairs are arranged to cross-connect the second and third phases of the source and of the motor, respectively. The switches ABR and ACF are arranged to connect the first source phase to the second and third motor phases, respectively, and the switches BAR and CAF interconnect the first motor phase to the second and third source phases, respectively.

As can be seen in FIG. 2, in each switch a plus symbol "+" is associated with the gate or control electrode of a switch that may be commanded to conduct positive motor current, (e.g. current flow to the motor) and a minus symbol "−" is associated with the gate or control electrode of the switch that may be commanded to conduct negative motor current (e.g. current flow from the motor).

If, for example, thyristors are used, to turn on an individual thyristor, an appropriate signal is applied to the associated gate while the main electrodes of that thyristor are forward biased (i.e., anode potential is positive with respect to cathode). Such a signal is sometimes called a trigger or gating signal, and it is herein referred to generically as a "firing signal." Subsequently, due to the periodic reversal of the source voltage polarity, the main electrodes will become reverse biased whereupon the thyristor automatically turns off (i.e., it reverts to its high-resistance, non-conducting, open circuit state) by an "a-c line commutation" process.

The firing signals for the controllable switches are supplied by the cycle-skippers, such as cycle skippers $14_1$ and $14_2$ (FIG. 1). In a manner that will be explained below, the cycle-skippers may be configured to cyclically produce, in synchronism with the source voltage, alternative families of periodic firing signals configured to reduce the magnitude of the harmonic components. It will be appreciated that the particular number, combination and pattern of the firing signals in a family may also be influenced by factors such as: what fraction 1/N of full speed is desired (N being a predetermined integer such as 2 or 4); whether a forward or reverse motor direction is commanded; whether a positive portion or a negative portion of the input source is used; whether variations exist between the circuit architecture of the cycle skippers, in the event of ½ speed, whether single-pulse or double-pulse cycle-skipping is performed, etc.

Figure 3:
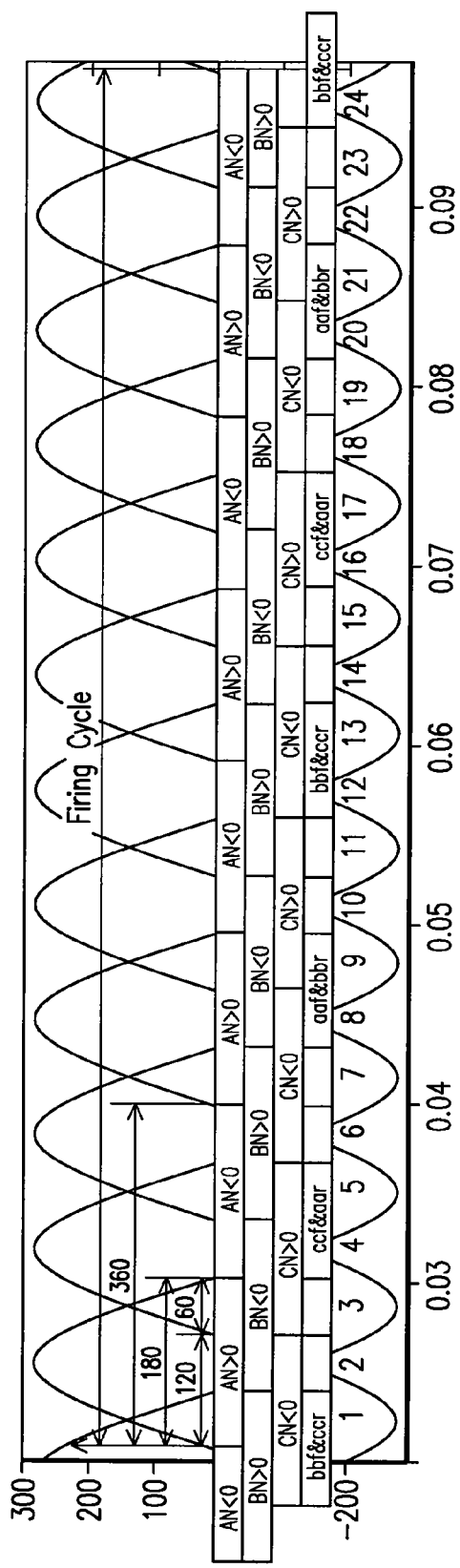
FIG. 3 is a plot of firing windows with respect to the line source voltage for two cycle skippers configured to provide quarter cycle speed operation and forward rotation for the motor, wherein each cycle skipper comprises the circuit architecture of FIG. 2.

FIG. 3 is a plot of firing windows with respect to the line source voltage and the power switches as arranged in FIG. 2 for two cycle skippers configured to provide quarter cycle speed operation and forward rotation for the motor. As seen in FIG. 3, in a ¼ speed output, the firing cycle may be made up of 24 firing windows, each comprising 60 electrical degrees. For example, in firing windows 2 and 3, switches AAF and BBR are fired for a first cycle skipper; in firing windows 6 and 7 switches BBF and CCR are fired for a second cycle skipper; in firing windows 10 and 11, switches CCF and AAR are fired for the first cycle skipper; in firing windows 14 and 15 switches AAF and BBR are fired for the second cycle skipper; and in firing windows 22 and 23 switches CCF and AAR are fired for the first cycle skipper. The foregoing firing sequence is repeated for subsequent firing cycles.

It will be appreciated that the firing windows for the first and second cycle skippers are not concurrent. More particularly, such firing windows are configured to exhibit a phase angle shift with respect to one another (e.g., non-concurrent firings), and this phase shifting between the firing patterns applied to the first and second cycle-skippers enables to advantageously reduce the magnitude of the harmonic components. The foregoing example is extended below to four cycle-skippers.

FIG. 4 indicates an example family of firing signals for up to four cycle skippers, as the one cycle skipper shown in FIG. 2, and represents an example of ¼ speed, forward motor rotation, wherein positive portions of the input signal waveforms are utilized. For example, the column labeled CS1 represents the firing signals applied to the power switches of a first cycle skipper. (Note that column CS1 contains the same firing sequence described above in the context of FIG. 3 for the first cycle skipper). The column labeled CS2 represents the firing signal applied to the power switches of a second cycle skipper. (Note that column CS2 contains the same firing sequence described above in the context of FIG. 3 for the second cycle skipper). It will thus be appreciated that the left half of FIG. 4, (firing signals for CS1 and CS2) essentially conveys the same information depicted in FIG. 3.

The column labeled SOURCE/LOAD indicates phase interconnections between the source and the load, which are enabled by the specific switches indicated as being fired during a given firing window. For example, when switches AAF and BBR are fired, the column labeled SOURCE/LOAD lists Vab⇒Vab. This indicates that the firing of switches AAF and BBR enables an interconnection of source phases A and B to load phases A and B. Similarly, when switches BBF and CCR are fired, the column labeled SOURCE/LOAD lists Vbc⇒Vbc. This indicates that the firing of switches BBF and CCR enable an interconnection of source phases B and C to load phases B and C. The xxxxxx entries indicate that no switches are fired during the corresponding firing windows.

The column labeled CS3 in FIG. 4 represents the firing signals applied to the power switches of a third cycle skipper, and the column labeled CS4 represents the firing signals applied to the power switches of a fourth cycle skipper. Firstly, note that except for the phase angle shifting illustrated between one another, the firing pattern is essentially the same for each of the cycle skippers. Secondly, note that the combination of firing signals for the first and second cycle skippers, and for the third and fourth cycle skippers due to symmetry considerations will give rise to an optimal reduction of harmonics. It will be appreciated, however, that, for example, one could implement other combinations of firing sequences, if optimal reduction of harmonics is not a consideration. For example, in the event of connecting two cycle skippers, one could combine the firing sequence of the first and the third cycle skippers, or, in the alternative, the firing sequences of the second and fourth cycle skippers. Below are additional examples of firing patterns under various operational conditions for cycle skippers comprising the baseline circuit architecture shown in FIG. 2.

FIG. 5 indicates a family of firing signals for up to four cycle skippers, as the one cycle skipper shown in FIG. 2, and represents an example of ¼ speed operation, wherein positive portions of the input signal waveforms are utilized.

FIG. 6 indicates a family of firing signals for up to four cycle skippers, as the one cycle skipper shown in FIG. 2, and represents an example of ¼ speed operation, wherein negative portions of the input signal waveforms are utilized. The foregoing examples correspond to various typical applications of ¼ speed operations, wherein the harmonic reduction is implemented by configuring the firing patterns applied to two or more cycle skippers to have a selected phase angle shifting between one another. Below one will now find examples corresponding to ½ speed operation.

FIG. 7 indicates a family of firing signals for a number of two cycle skippers, as the one cycle skipper shown in FIG. 2, and represents an example of ½ speed single pulse, wherein positive portions of the input signal waveforms are utilized.

FIG. 8 indicates a family of firing signals for a number of two cycle skippers, as the one cycle skipper shown in FIG. 2, and represents an example of ½ speed single pulse, wherein positive portions of the input signal waveforms are utilized.

Thus far one has shown various example embodiments wherein harmonic reductions can be achieved in a motor speed control system for variable speed alternating current (ac) electromotive machines based on providing a predefined phase angle shift to the firing signals applied to two or more cycle skippers connected to a common source. That is, such harmonic reductions may be achieved by programming the controller 20 to command the cycle skippers, to shift the firing patterns and achieve a desired phase shifting. These embodiments may be particularly attractive for applications involving field-deployed hardware since in this aspect of the invention one need not reconfigure such field-deployed hardware (e.g., pre-existing hardware). For example, presuming that the field-deployed hardware comprises the baseline circuit architecture illustrated in FIG. 2, one can achieve the benefits of the present invention by reconfiguring the software in the controller 20 and in the cycle skippers, without affecting the pre-existing hardware.

The inventors of the present invention have further recognized that aspects of the present invention need not be limited to the baseline circuit architecture illustrated in FIG. 2. By way of background explanation, it is noted that the circuit architecture illustrated in FIG. 2 makes use of fourteen power switches for implementing a given set of phase interconnections between source and load. It will be appreciated, however, that an architecture that uses fourteen power switches for implementing these phase interconnections between source and load, just comprises a subset of the full set of interconnections that in a general case can be implemented with a cycle converter that uses a full complement of power switches (e.g., eighteen power switches). That is, the present inventors have innovatively recognized that the baseline architecture shown in FIG. 2 may be adapted to capture phase interconnections not available to the baseline configuration. Thus, presuming that the circuit architecture of the cycle skippers to be used comprises a subset (e.g., less than 18 power switches) of the power switches typically available in a full cycle converter, then alternative circuit architectures may be provided that conceptually can equally benefit from aspects of the present invention. It is believed that in practice using alternative circuit architectures (e.g., different hardware configurations) may not be as readily attractive as the simplicity of just reconfiguring the controller software since this aspect would require developing and maintaining different hardware configurations.

Figure 9:
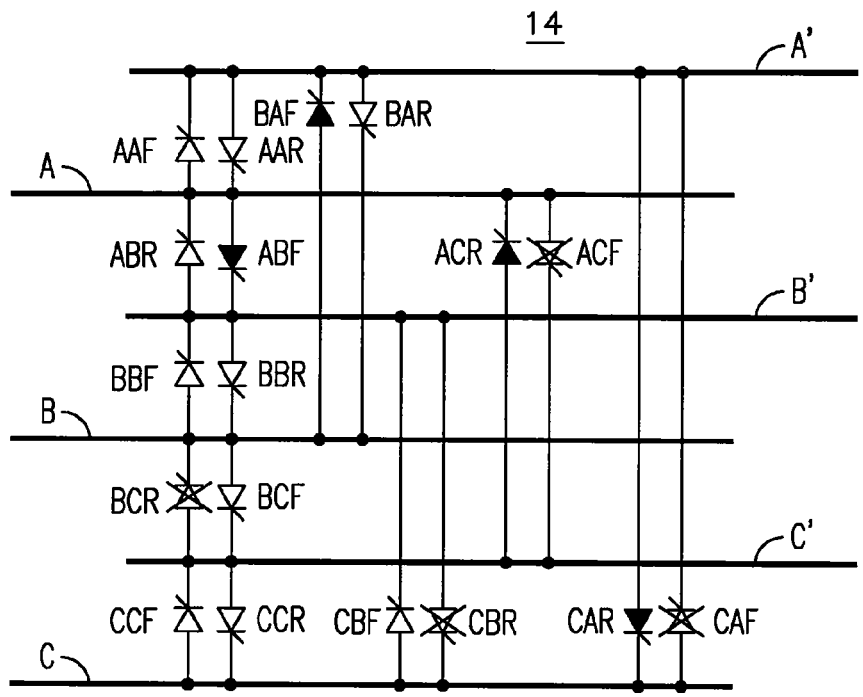
FIG. 9 illustrates one example of hardware modifications made to the baseline circuit architecture of FIG. 2.

FIG. 9 illustrates a first example variation with respect to the baseline circuit architecture illustrated in FIG. 2. More particularly, the power switches drawn in solid represent switches added, and power switches drawn with a cross-over line represent power switches deleted.

FIG. 10 indicates a family of firing signals for up to four cycle skippers, as the one cycle skipper shown in FIG. 9, and represents an example of ¼ speed, wherein positive portions of the input signal waveforms are utilized to, for example, achieve CBA output phase rotation with CBA input phase rotation.

FIG. 11 indicates a family of firing signals for up to four cycle skippers, as the one cycle skipper shown in FIG. 9, and represents an example of ¼ speed operation, wherein positive portions of the input signal waveforms are utilized to, for example, achieve CBA output phase rotation with CBA input phase rotation.

FIG. 12 indicates a family of firing signals for a total number of four cycle skippers, as the one cycle skipper shown in FIG. 9, and represents an example of ¼ speed operation, wherein negative portions of the input signal waveforms are utilized to, for example, achieve CBA output phase rotation with CBA input phase rotation. The foregoing examples correspond to various typical applications of ¼ speed operations, wherein the harmonic reduction is implemented by configuring the firing patterns applied to two or more cycle skippers, to have a selected phase angle shifting between one another. Below one will now find examples corresponding to ½ speed operation.

FIG. 13 indicates a family of firing signals for a number of two cycle skippers, as the one cycle skipper shown in FIG. 9, and represents an example of ½ speed, single pulse, wherein negative portions of the input signal waveforms are utilized to, for example, achieve CBA output phase rotation with CBA input phase rotation.

FIG. 14 indicates a family of firing signals for a number of two cycle skippers, as the one cycle skipper shown in FIG. 9, and represents an example of ½ speed, single pulse, wherein positive portions of the input signal waveforms are utilized.

Figure 15:
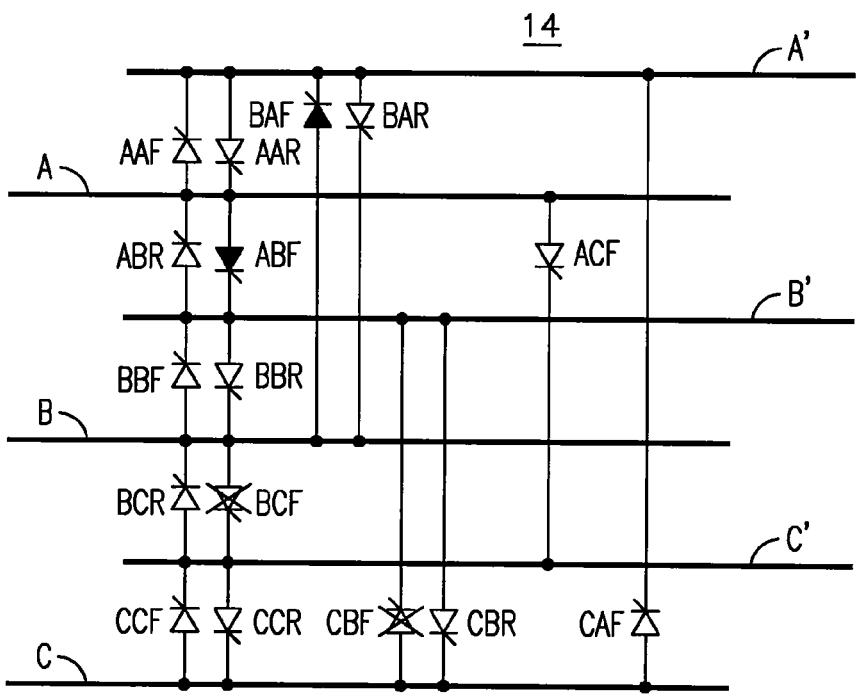
FIG. 15 illustrates another example of hardware modifications made to the baseline circuit architecture of FIG. 2.

FIG. 15 illustrates a second example variation with respect to the baseline circuit architecture illustrated in FIG. 2. Again, the power switches drawn in solid represent power switches which have been added and power switches drawn with a cross-over line represent power switches which have been deleted.

FIG. 16 indicates a family of firing signals for a total of up to four cycle skippers, as the one cycle skipper shown in FIG. 15, and represents an example of ¼ speed operations, wherein positive portions of the input signal waveforms are utilized to, for example, achieve ABC output phase rotation with CBA input phase rotation.

FIG. 17 indicates a family of firing signals for a total number of two cycle skippers, as the one cycle skipper shown in FIG. 15, and represents an example of ½ speed, double-pulse operation, wherein positive portions of the input signal waveforms are utilized to, for example, achieve CBA output phase rotation with CBA input phase rotation.

Figure 18:
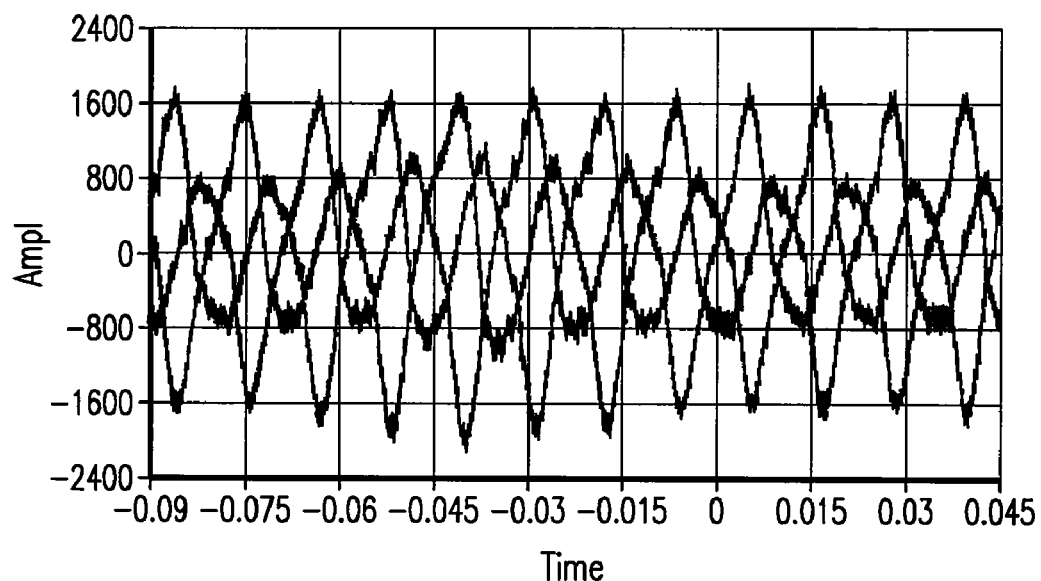
FIGS. 18–21 respectively show comparative plots of load current for a cycle skipping system with two cycle skippers controlled with phase angle shifting techniques (e.g., non-concurrent firings) embodying aspects of the present invention (FIGS. 19 and 21) versus a cycle skipping system with cycle skippers controlled with conventional firing techniques (concurrent firings) (FIGS. 18 and 20).
Figure 19:
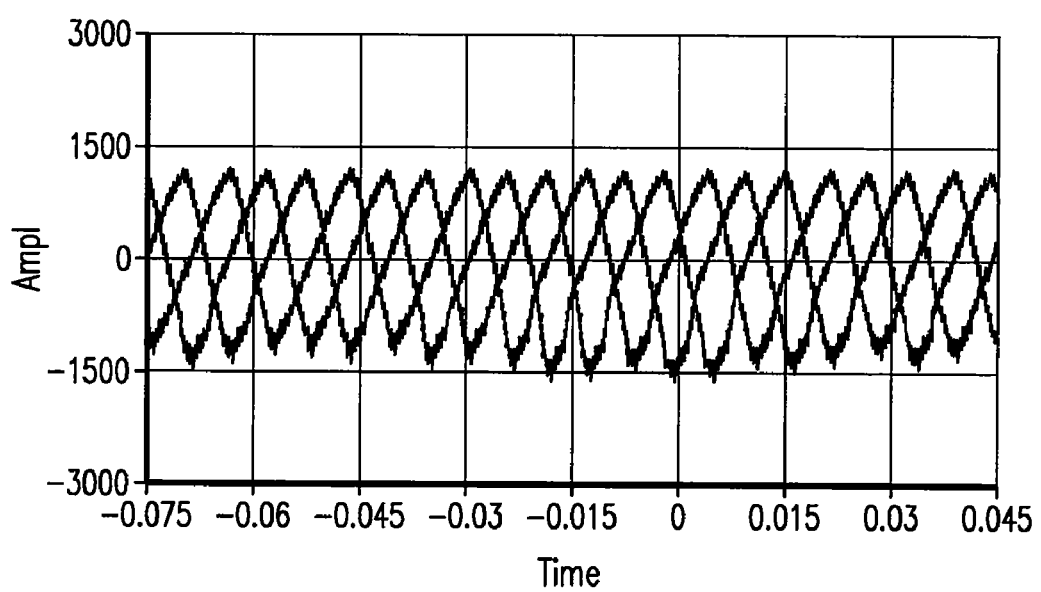

FIG. 18 is a plot of load phase currents for two radiator fans driven by cycle skippers controlled using traditional control techniques (e., no phase angle shift) to provide ½ speed, single pulse operation. Compare the harmonic reduction shown in FIG. 19, which is a plot of load phase currents for two radiator fans driven by cycle skippers controlled using control techniques embodying aspects of the present invention (non-concurrent firings) to provide ½ speed, single pulse operation.

Figure 20:
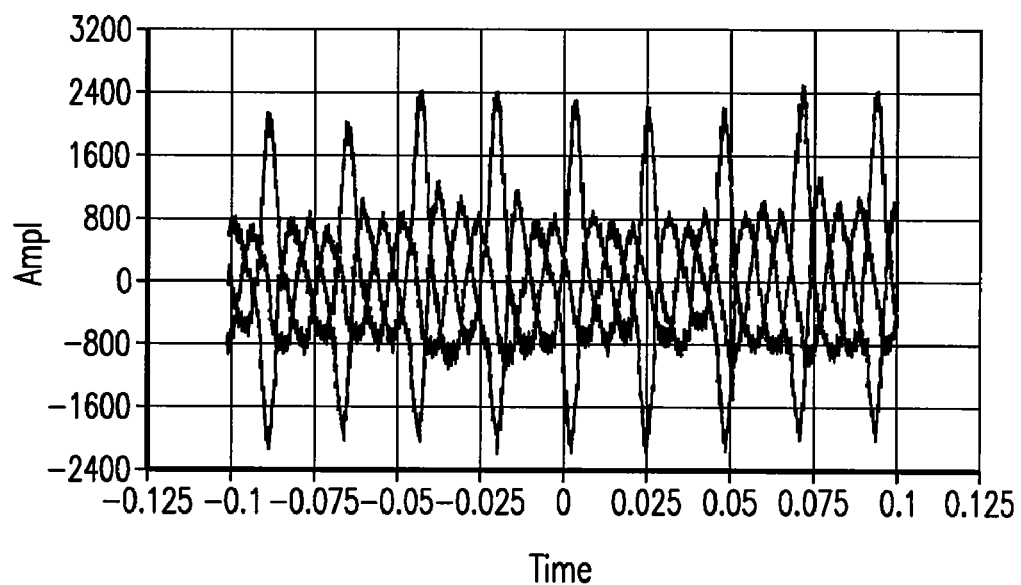
Figure 21:
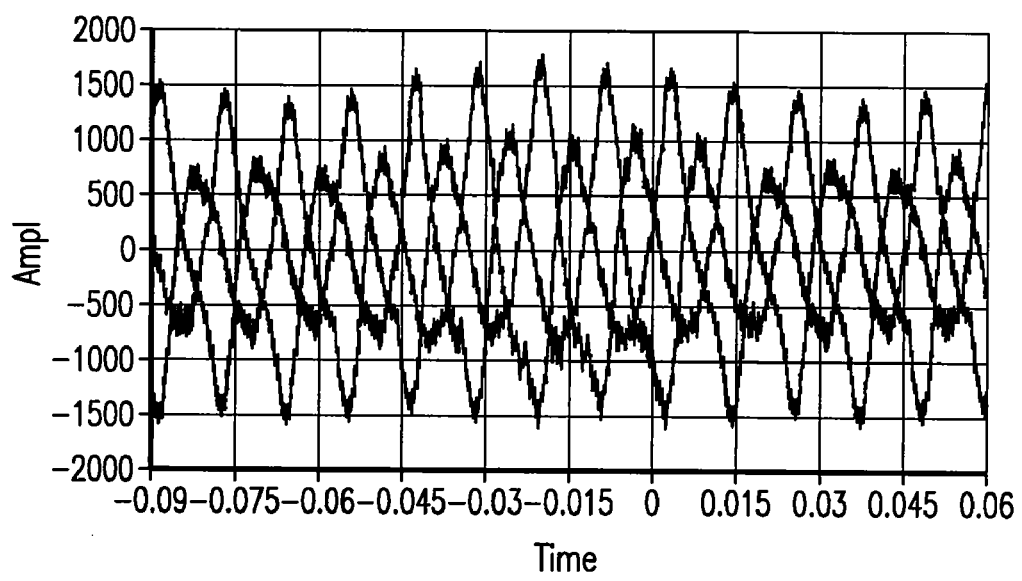

FIG. 20 is a plot of load phase currents for two radiator fans driven by cycle skippers controlled using traditional control techniques (no phase angle shift) to provide ¼ speed operation. Compare the harmonic reduction shown in FIG. 21, which is a plot of load phase currents for two radiator fans driven by cycle skippers controlled using control techniques embodying aspects of the present invention (non-concurrent firings) to provide ¼ speed.

It will be appreciated that establishing and maintaining a firing synchronization between two or more cycle skippers embodying aspects of the present invention is desirable since this ensures that no concurrent firings will occur for such cycle skippers. For example, it may be desirable to ensure that a first cycle skipper is synchronized relative to a given timing reference frame, e.g., this first cycle skipper may be synchronized to have a firing sequence that starts at a given phase angle, such as a zero phase angle. Similarly, it may be desirable to ensure that a second cycle skipper is also synchronized relative to the same reference frame, and hence synchronized relative to the first cycle skipper, e.g., this second cycle skipper may be synchronized to have a firing sequence which is shifted by 180 degrees with respect to the firing sequence of the first cycle skipper. It will be appreciated that the firing synchronization between two or more cycle skippers can be achieved in a variety of ways. Below is a listing of various example techniques that may be used for achieving the firing synchronization.

- Single hard-wired common synchronization signal for all cycle skippers, e.g., one master and n slaves
- Software-based synchronization by command from supervisory controller or master/slave configuration, such as may be implemented by monitoring source voltage and/or currents
- Software-based synchronization by command from supervisory controller or master/slave configuration, such as may be implemented by monitoring source voltage and/or cycle-skippers firing states
- Software-based synchronization by command from supervisory controller, or master/slave configuration, such as may be implemented by monitoring source voltage frequency variation, zero crossings, phase angle variation, or combinations of the foregoing parameters
- Software-based synchronization by command from supervisory controller, or master/slave configuration, such as may be implemented by monitoring generator shaft RPM.
- Software-based synchronization by command from supervisory controller, or master/slave configuration, such as may be implemented by monitoring generator excitation (e.g., percent of firing angle)
- Software-based synchronization by command from supervisory controller, or master/slave configuration, such as may be implemented by monitoring generator shaft position.
- Software-based self-synchronization, e.g., master/slave configuration, such as may be implemented by monitoring source voltage zero crossings Software-based self-synchronization e.g., master/slave configuration, such as may be implemented by monitoring source voltage frequency Software-based self-synchronization e.g., master/slave configuration, such as may be implemented by monitoring load currents Arbitrary timing phase-shift based on supervisory controller, or master/slave configuration, as may be commanded via a communications link Arbitrary timing phase-shift based on supervisory controller, or master clock pulse Combination of cycle skippers with different circuit architectures allowing improved current density distribution (e.g., a combination 14 SCRs and 16 SCRs cycle skipper configurations)

The inventors of the present invention have innovatively recognized that one may also reduce the harmonic components in the currents supplied by the power source connected to drive the cycle-skipping system, and in the currents that flow in the electrical phases of a variable frequency load driven by the cycle skipping system using the following example control techniques, individually or in combination with the phase shifting techniques described above.

One example control technique may be performed by arranging the stream of pulses that make up the firing sequence applied over a firing cycle to the power switches in a given cycle skipper to form at least one grouping of two or more closely adjacent pulses over a time interval. For example, each pulse grouping may be configured to contribute a desired spectral power over the time interval. This may involve appropriately selecting one or more characteristics for any of the individual pulses in a given pulse grouping. Examples of such characteristics may be pulse amplitude, pulse width, and power density. This enables to spread the power over the time interval as compared to a single pulse with the same desired spectral power. The utilization of two or more closely adjacent pulses, such as double, triple, etc., for example, may provide the following benefits: reducing the undesirable effects due to current harmonics, such as torque pulsation, heating and noise; reducing current peaks in the source and load currents; reducing pullouts in a motor driven by the cycle skipping system; and under certain conditions may allow an unassisted motor start.

Another example control technique for reducing the harmonic components in the source/load currents may be performed by selecting different source voltages to generate the load currents, and by arranging the stream of pulses so that a current, as may flow in a respective electrical phase of the load in response to the firing sequence, comprises at least a first group of pulses having a combined first polarity, and further comprises a second group of pulses having a combined second polarity.

The first polarity (e.g., a positive voltage) is opposite to the second polarity (e.g., a negative voltage). In one example embodiment, optimal reduction in the harmonic components occurs when the first group is shifted relative to the second group by a selected time gap, and the time gap between any successive first and second pulse groups is uniformly distributed over the firing cycle. Reduction (although somewhat reduced as compared to the optimized case described above) in the harmonic components also occurs when the time gap between any successive first and second pulse groups is non-uniformly distributed over the firing cycle.

The description below will describe various example embodiments of the foregoing techniques, which as noted above may be advantageously (but need not be) used in combination with the phase shifting techniques, as may be used for a system consisting of more than one cycle skipper. That is, the foregoing techniques may be flexibly applied to a system consisting of just one cycle skipper or to a system consisting of more than one cycle skipper.

Figure 22:
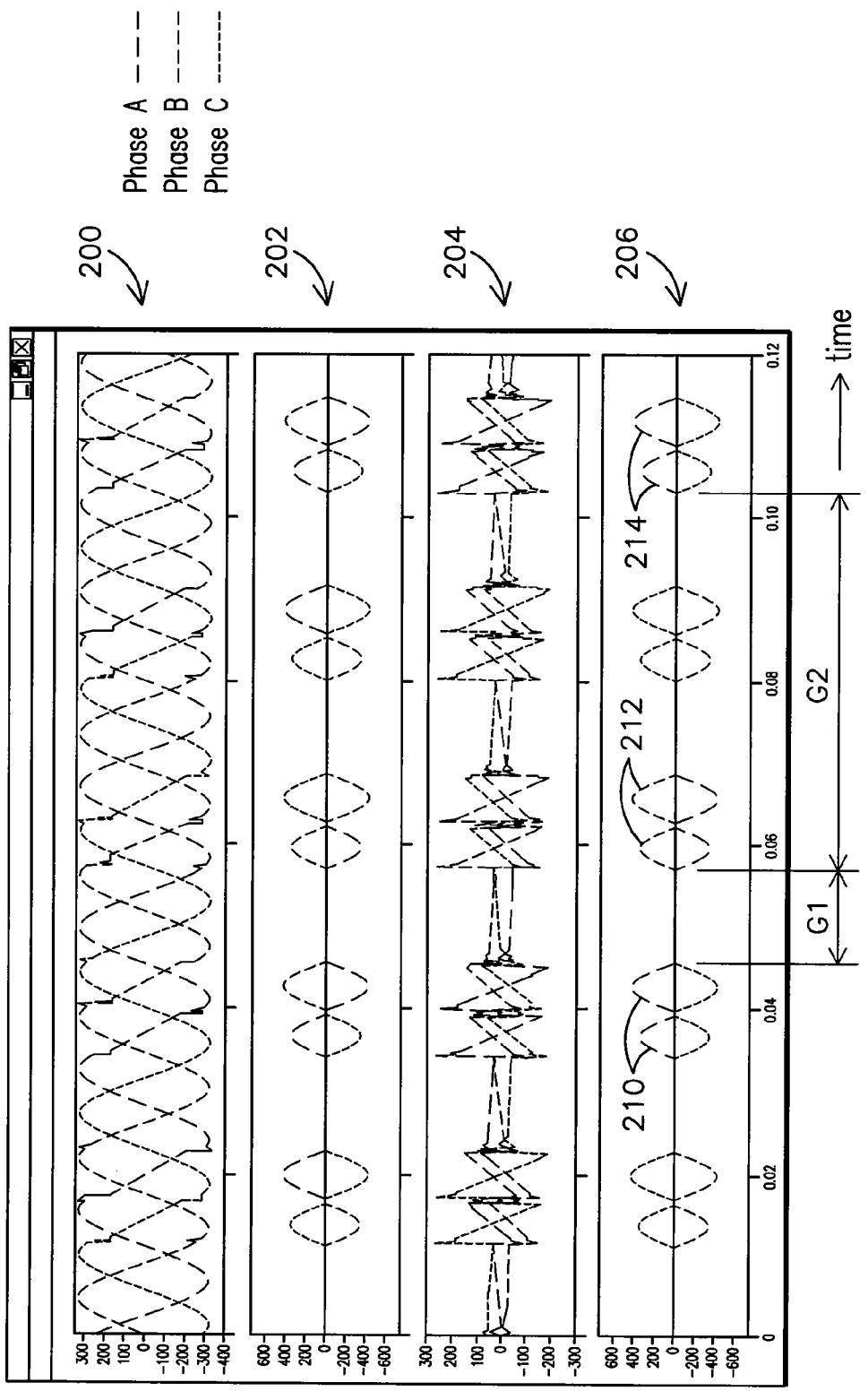
Figure 23:
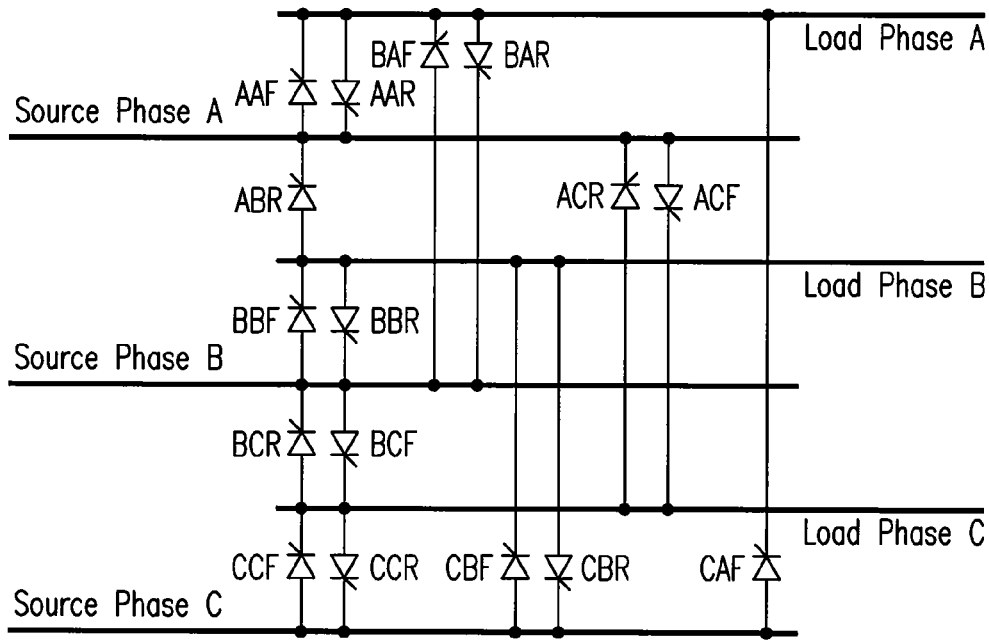

FIGS. 22, 23, and 24 are directed to one example embodiment regarding a three-phase cycle skipping system configured to operate at ¼ speed operation, wherein a firing sequence comprises groupings of double pulses, wherein the time gap between any successive first and second pulse groups in a respective electrical phase of the load comprises non-uniformly distributed gaps.

FIG. 22 shows exemplary source voltage waveforms 200, source current waveforms 202, load voltage waveforms 204, and load current waveforms 206. For a given load electrical phase 208, note the example groupings of double pulses 210, 212 and 214. Also note the non-uniform time gaps G1 and G2 between groups having an opposite polarity. This characteristic is seen in the other electrical phases of the load.

FIG. 23 illustrates one example circuit architecture comprising 16 power switches for one cycle skipper and FIG. 24 indicates an exemplary family of firing signals for a system of two cycle skippers, as the one cycle skipper shown in FIG. 23, and represents an example wherein positive portions of the input signal waveforms are utilized to achieve CBA output phase rotation with CBA input phase rotation.

Figure 26:
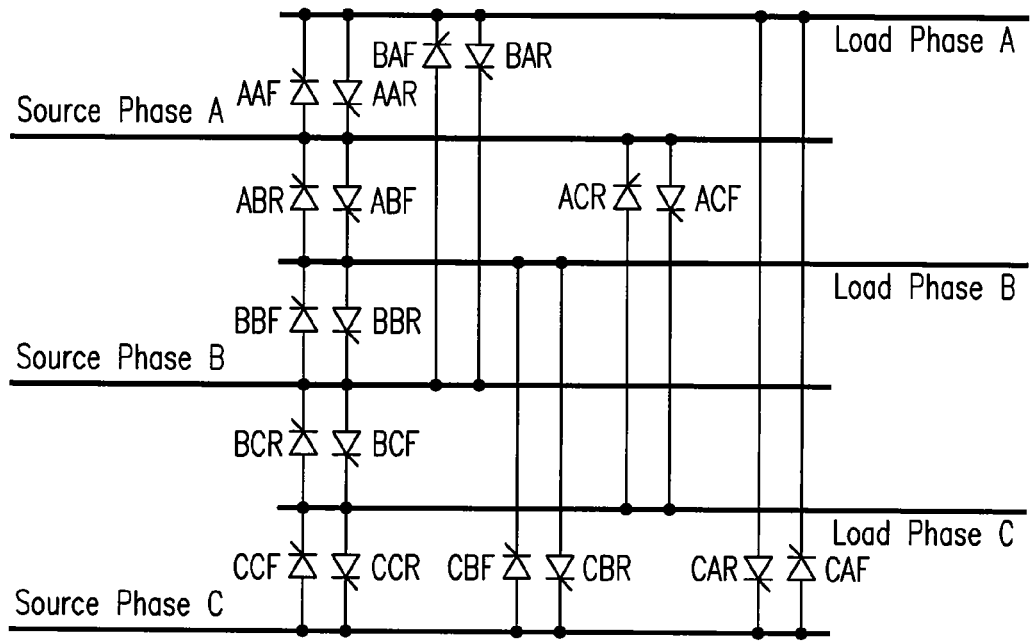
Figure 25:
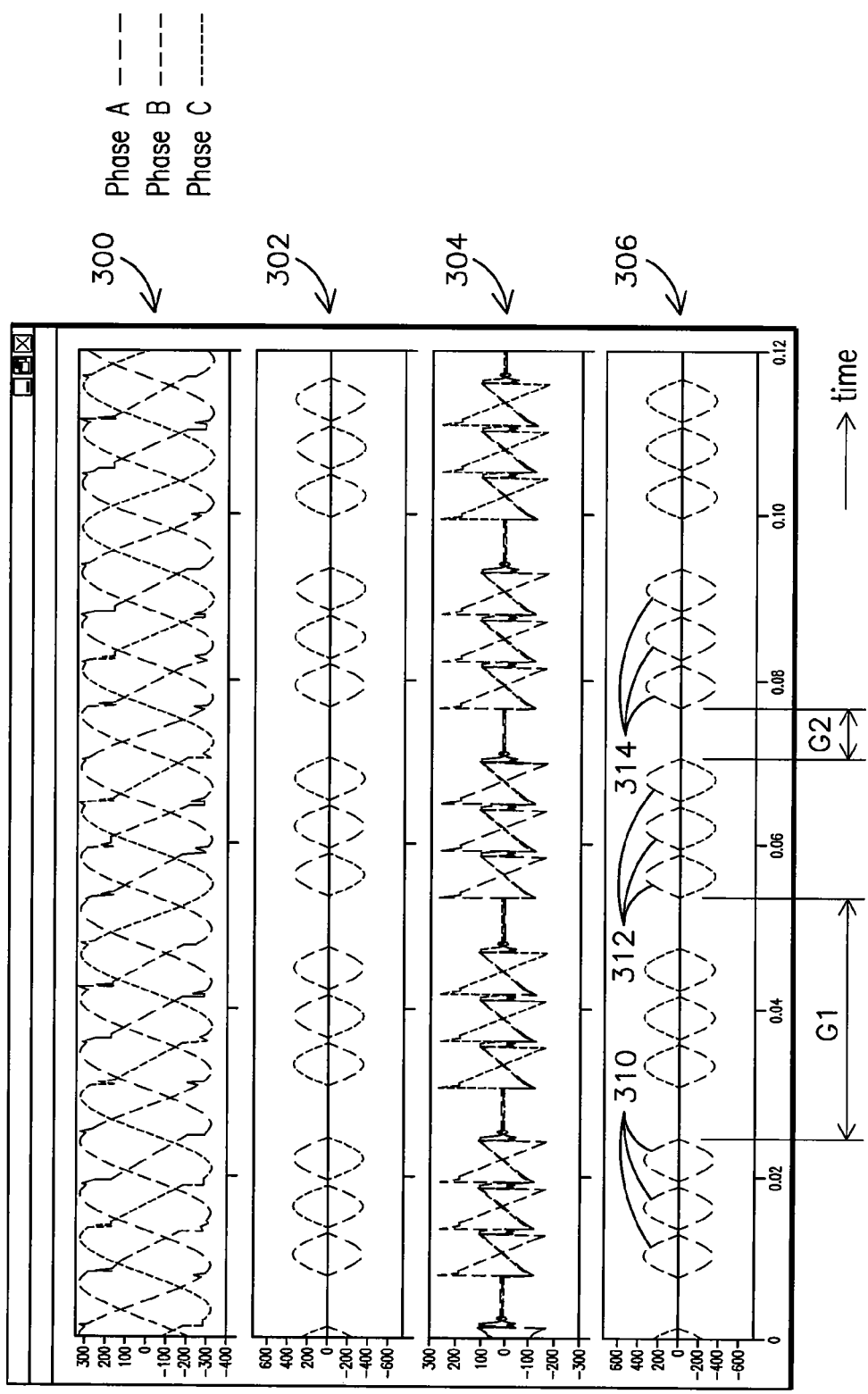

FIGS. 25, 26, and 27 are directed to one example embodiment regarding a three-phase cycle skipping system operating at ¼ speed operation, wherein a firing sequence comprises groupings of triple pulses, wherein the time gap between any successive first and second pulse groups having a combined opposite polarity in a respective electrical phase of the load comprises non-uniformly distributed gaps. FIG. 25 shows exemplary source voltage waveforms 300, exemplary source current waveforms 302, exemplary load voltage waveforms 304, and exemplary load current waveforms 306. For a given electrical phase 308, note the example groupings of triple pulses 310, 312 and 314. Also note the non-uniform time gaps G1 and G2 between groups having an opposite polarity.

Figure 28:
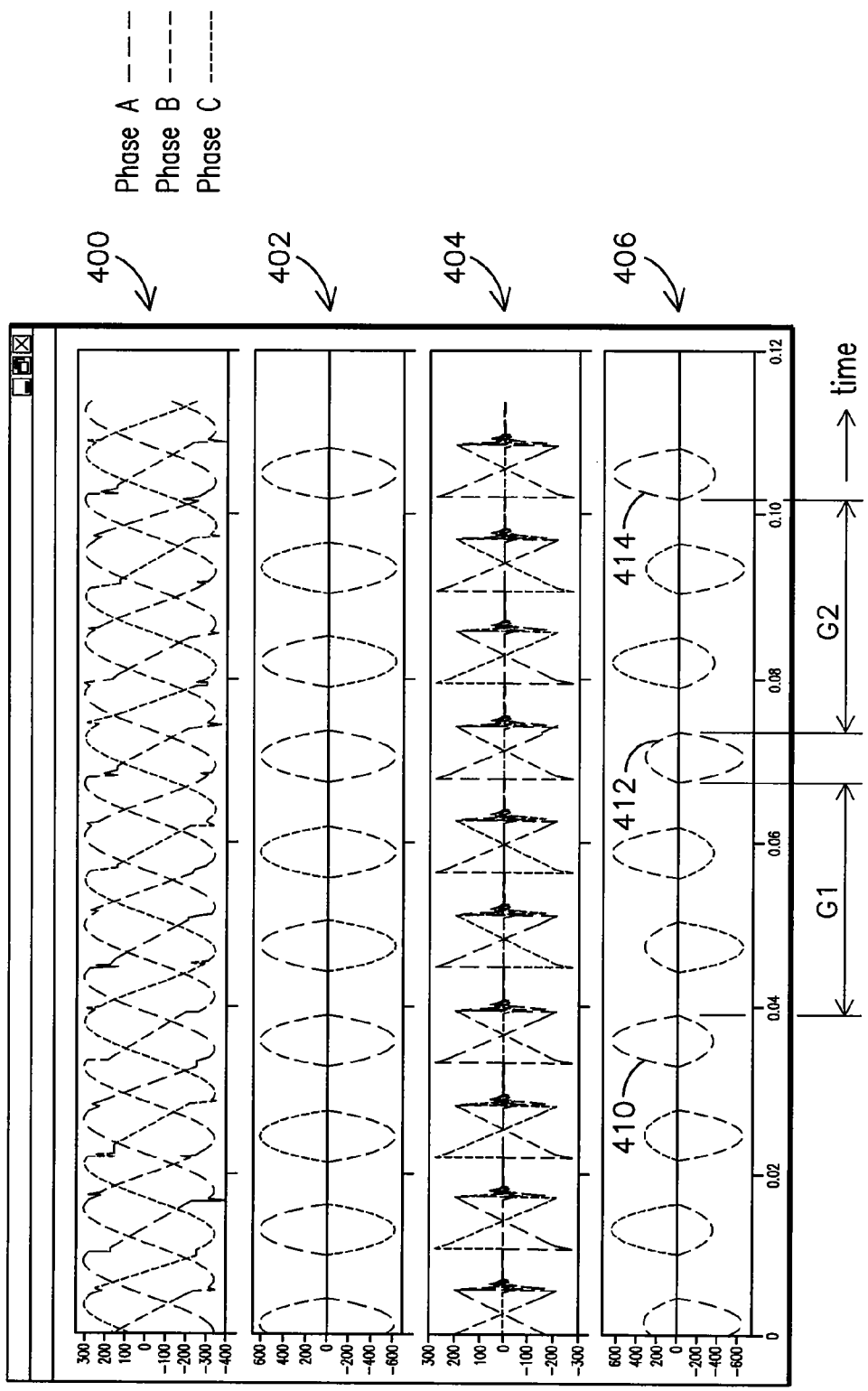
Figure 30:
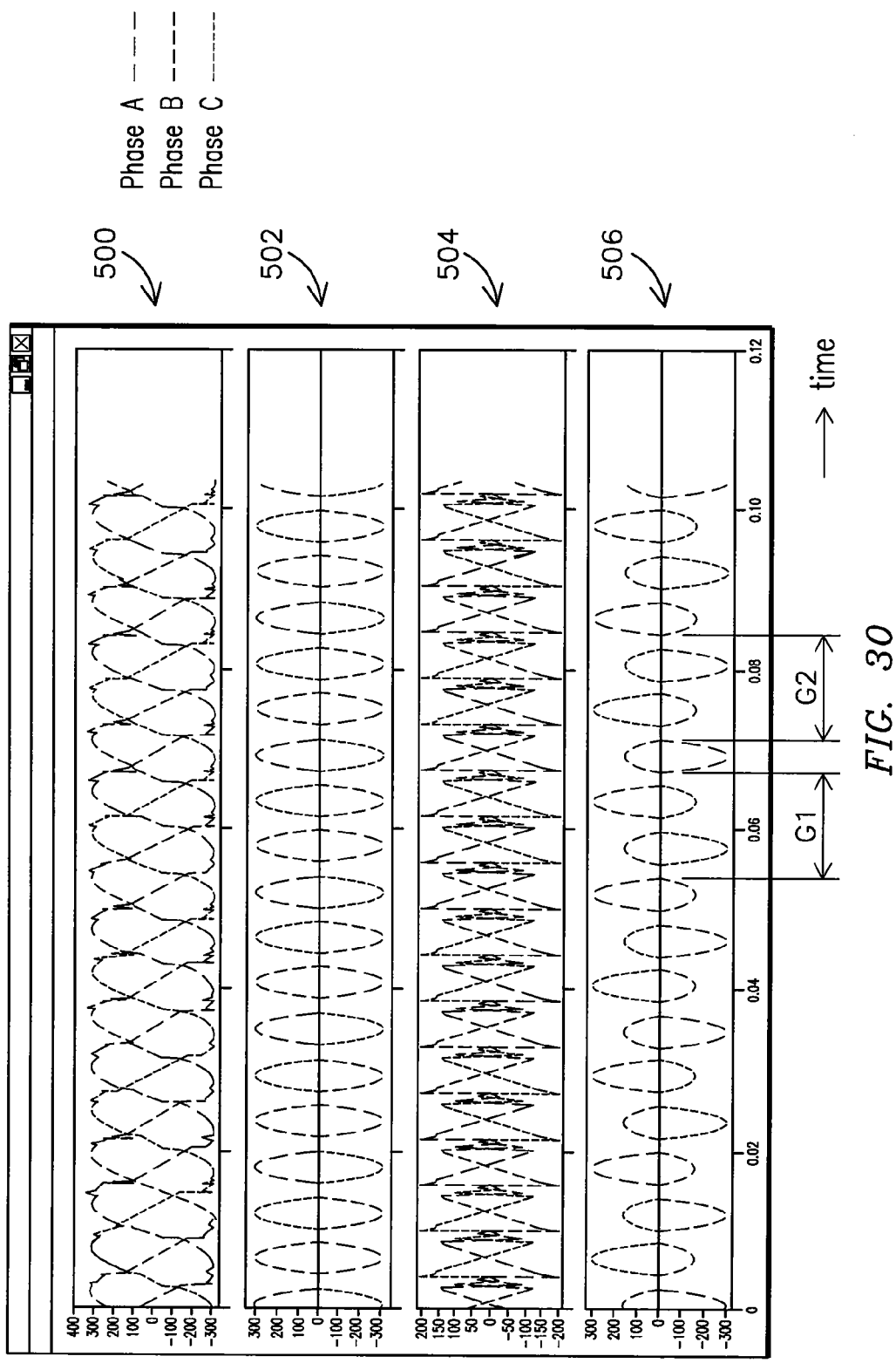

FIG. 26 illustrates one example circuit architecture comprising 18 power switches for one cycle skipper, and FIG. 27 indicates an exemplary family of firing signals for a system of two cycle skippers, as the one cycle skipper shown in FIG. 26. FIGS. 28 and 29 are directed to one example embodiment regarding a three-phase cycle skipping system operating at ¼ speed operation, wherein a firing sequence comprises groupings of triplet pulses, wherein the time gap between any successive first and second pulse groups having a combined opposite polarity in a respective electrical phase of the load comprises uniformly distributed gaps.

FIG. 28 shows exemplary source voltage waveforms 400, exemplary source current waveforms 402, exemplary load voltage waveforms 404, and exemplary load current waveforms 406. For a given electrical phase 408, note the example groupings of triple pulses 410, 412 and 414. Also note the uniform time gaps G1 and G2 between groups having an opposite polarity. Based on simulations, it is contemplated that the combination of triple pulses (e.g., enhanced spectral power distribution) and uniform time gaps (e.g., symmetrical spectral power distribution) may allow an unassisted motor start.

FIG. 29 indicates an exemplary family of firing signals for a system of two cycle skippers, as the one cycle skipper shown in FIG. 26.

Aspects of the present invention can be embodied in the form of computer-implemented processes and apparatus for practicing those processes. The present invention can also be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. For example, although example embodiments have been described in the context of a three phase system, it will be understood that aspects of the present invention can be similarly incorporated for single or any multi phase system. Accordingly, it is intended that the invention be limited only by the spirit and scope of the appended claims.

The invention claimed is:

1. A method for controlling a cycle-skipping control system comprising at least one cycle skipper connected to a multi-phase AC (alternating current) power source to drive a variable frequency load, said method comprising:
   selecting a desired mode of operation for the cycle-skipping control system;
   generating a respective firing sequence comprising a stream of pulses to be applied over a firing cycle to a plurality of power switches in the at least one cycle skipper for implementing the desired mode of operation; and
   arranging the stream of pulses to form at least one grouping of two or more closely adjacent pulses over a time interval, wherein each pulse grouping contributes a desired spectral power over the time interval, and further wherein each pulse grouping enables to spread the power over the time interval as compared to a single pulse having the desired spectral power, thereby reducing harmonic components in at least one of the following: currents and/or voltages supplied by the power source, and currents and/or voltages that drive the load, in response to the firing sequence.

2. The method of claim 1 wherein a current being generated in response to the firing sequence, in a respective electrical phase of the load, comprises a first group of pulses having a combined first polarity, and further comprises a second group of pulses having a combined second polarity, wherein the second polarity is opposite to the first polarity, and further wherein the first group is shifted relative to the second group by a selected time gap.

3. The method of claim 2 wherein the time gap between any successive first and second pulse groups is uniformly distributed over the firing cycle.

4. The method of claim 2 wherein the time gap between any successive first and second pulse groups is non-uniformly distributed over the firing cycle.

5. The method of claim 1 further comprising providing a predefined phase angle shift between respective firing sequences to be applied to two or more cycle skippers over a firing cycle, wherein said phase angle shift enables a non-concurrent firing for each cycle skipper over the firing cycle.

6. A method for controlling a cycle-skipping control system comprising at least one cycle skipper connected to a multi-phase AC (alternating current) power source to drive a variable frequency load, said method comprising:
   selecting a desired mode of operation for the cycle-skipping control system;
   generating a respective firing sequence comprising a stream of pulses to be applied over a firing cycle to a plurality of power switches in the at least one cycle skipper for implementing the desired mode of operation;
   arranging the stream of pulses so that a current being generated in a respective electrical phase of the load in response to the firing sequence comprises at least a first group of pulses having a combined first polarity, and further comprises a second group of pulses having a combined second polarity, the first polarity being opposite to the second polarity, wherein the first group is shifted relative to the second group by a selected time gap, and further wherein the time gap between any successive first and second pulse groups is uniformly distributed over the firing cycle, thereby reducing harmonic components in currents and/or voltages supplied by the power source, and in load currents and/or voltages, in response to the firing sequence.

7. The method of claim 6 wherein the arranging further comprises arranging the stream of pulses to form at least one grouping of two or more closely adjacent pulses over a time interval, wherein each pulse grouping contributes a desired spectral power over the time interval, and further wherein each pulse grouping enables to spread the power over the time interval as compared to a single pulse having the desired spectral power.

8. The method of claim 6 further comprising providing a predefined phase angle shift between respective firing sequences to be applied to two or more cycle skippers over a firing cycle, wherein said phase angle shift enables a non-concurrent firing for each cycle skipper over the firing cycle.

9. A controller for a cycle-skipping control system comprising at least one cycle skipper connected to a multi-phase AC (alternating current) power source to drive a variable frequency load, the controller comprising:
   a mode selector for selecting a desired mode of operation for the cycle-skipping control system;
   a sequence generator for generating a respective firing sequence to be applied to a plurality of power switches in at least one cycle skipper for implementing the desired mode of operation, wherein the stream of pulses is arranged to form at least one grouping of two or more closely adjacent pulses over a time interval, wherein each pulse grouping contributes a desired spectral power over the time interval, and further wherein each pulse grouping enables to spread the power over the time interval as compared to a single pulse having the desired spectral power, thereby reducing harmonic components in currents and/or voltages supplied by the power source, and in load currents and/or voltages, in response to the firing sequence.

10. The controller of claim 9 wherein a current being generated in response to the firing sequence, in a respective electrical phase of the load, comprises a first group of pulses having a combined first polarity, and further comprises a second group of pulses having a combined second polarity, wherein the second polarity is opposite to the first polarity, and further wherein the first group is shifted relative to the second group by a selected time gap.

11. The controller of claim 10 wherein the time gap between any successive first and second pulse groups is uniformly distributed over the firing cycle.

12. The controller of claim 10 wherein the time gap between any successive first and second pulse groups is non-uniformly distributed over the firing cycle.

13. The controller of claim 9 further comprising a phase shifter configured to provide a predefined phase angle shift between respective firing sequences to be applied to two or more cycle skippers over a firing cycle, wherein said phase angle shift enables a non-concurrent firing for each cycle skipper over the firing cycle.

14. A controller for controlling a cycle-skipping control system comprising at least one cycle skipper connected to a multi-phase AC (alternating current) power source to drive a variable frequency load, said controller comprising:
  a mode selector for selecting a desired mode of operation for the cycle-skipping control system; and
  a sequence generator for generating a respective firing sequence comprising a stream of pulses to be applied over a firing cycle to a plurality of power switches in the at least one cycle skipper for implementing the desired mode of operation, wherein the stream of pulses is arranged so that a current being generated in a respective electrical phase of the load in response to the firing sequence comprises at least a first group of pulses having a combined first polarity, and further comprises a second group of pulses having a combined second polarity, the first polarity being opposite to the second polarity, wherein the first group is shifted relative to the second group by a selected time gap, and further wherein the time gap between any successive first and second pulse groups is uniformly distributed over the firing cycle, thereby reducing harmonic components in currents and/or voltages supplied by the power source, and in load currents and/or voltages, in response to the firing sequence.

15. The controller of claim 14 wherein the sequence generator is configured to arrange the stream of pulses to form at least one grouping of two or more closely adjacent pulses over a time interval, wherein each pulse grouping contributes a desired spectral power over the time interval, and further wherein each pulse grouping enables to spread the power over the time interval as compared to a single pulse having the desired spectral power.

16. The controller of claim 14 further comprising a phase shifter for providing a predefined phase angle shift between respective firing sequences to be applied to two or more cycle skippers over a firing cycle, wherein said phase angle shift enables a non-concurrent firing for each cycle skipper over the firing cycle.

17. An article of manufacture comprising a computer program product comprising a computer-usable medium having a computer-readable code therein for controlling a cycle-skipping control system comprising at least one cycle skipper connected to a multi-phase AC (alternating current) power source to drive a variable frequency load, the computer-readable code comprising:
  computer-readable code for selecting a desired mode of operation for the cycle-skipping control system;
  computer-readable code for generating a respective firing sequence to be applied to a plurality of power switches in the at least one cycle skipper for implementing the desired mode of operation; and
  computer-readable code for arranging the stream of pulses to form at least one grouping of two or more closely adjacent pulses over a time interval, wherein each pulse grouping contributes a desired spectral power over the time interval, and further wherein each pulse grouping enables to spread the power over the time interval as compared to a single pulse having the desired spectral power, thereby reducing harmonic components in currents and/or voltages supplied by the power source, and in load currents and/or voltages, in response to the firing sequence.

18. The article of claim 17 further comprising computer-readable code so that a current being generated in response to the firing sequence in a respective electrical phase of the load, comprises a first group of pulses having a combined first polarity, and further comprises a second group of pulses having a combined second polarity, wherein the second polarity is opposite to the first polarity, and further wherein the first group is shifted relative to the second group by a selected time gap.

19. The article of claim 18 wherein the time gap between any successive first and second pulse groups is uniformly distributed over the firing cycle.

20. The article of claim 18 wherein the time gap between any successive first and second pulse groups is non-uniformly distributed over the firing cycle.

21. The article of claim 17 further comprising computer-readable code for providing a predefined phase angle shift between respective firing sequences to be applied to two or more cycle skippers over a firing cycle, wherein said phase angle shift enables a non-concurrent firing for each cycle skipper over the firing cycle.

22. An article of manufacture comprising a computer program product comprising a computer-usable medium having a computer-readable code therein for controlling a cycle-skipping control system comprising at least one cycle skipper connected to a multi-phase AC (alternating current) power source to drive a variable frequency load, the computer-readable code comprising:
  computer-readable code for selecting a desired mode of operation for the cycle-skipping control system;
  computer-readable code for generating a respective firing sequence to be applied to a plurality of power switches in the at least one cycle skipper for implementing the desired mode of operation; and
  computer-readable code for arranging the stream of pulses so that a current being generated in a respective electrical phase of the load in response to the firing sequence comprises at least a first group of pulses having a combined first polarity, and further comprises a second group of pulses having a combined second polarity, the first polarity being opposite to the second polarity, wherein the first group is shifted relative to the second group by a selected time gap, and further wherein the time gap between any successive first and second pulse groups is uniformly distributed over the firing cycle, thereby reducing harmonic components in currents and/or volatges supplied by the power source, and in load currents and/or voltages, in response to the firing sequence.

23. The article of claim 22 wherein the arranging further comprises arranging the stream of pulses to form at least one grouping of two or more closely adjacent pulses over a time interval, wherein each pulse grouping contributes a desired spectral power over the time interval, and further wherein each pulse grouping enables to spread the power over the time interval as compared to a single pulse having the desired spectral power.

24. The article of claim 22 further comprising providing a predefined phase angle shift between respective firing sequences to be applied to two or more cycle skippers over a firing cycle, wherein said phase angle shift enables a non-concurrent firing for each cycle skipper over the firing cycle.

* * * * *